US012761187B2

(12) United States Patent
Sakai et al.

(10) Patent No.: US 12,761,187 B2
(45) Date of Patent: Oct. 13, 2026

(54) ULTRASONIC INSPECTION DEVICE, ULTRASONIC INSPECTION METHOD, AND PROGRAM

(71) Applicant: Hitachi Power Solutions Co., Ltd., Ibaraki (JP)

(72) Inventors: Kaoru Sakai, Tokyo (JP); Masayuki Kobayashi, Tokyo (JP); Natsuki Sugaya, Ibaraki (JP); Koutaro Kikukawa, Ibaraki (JP)

(73) Assignee: HITACHI POWER SOLUTIONS CO., LTD., Ibaraki (JP)

( * ) Notice: Subject to any disclaimer, the term of this patent is extended or adjusted under 35 U.S.C. 154(b) by 520 days.

(21) Appl. No.: 18/264,276

(22) PCT Filed: Feb. 25, 2022

(86) PCT No.: PCT/JP2022/008093

§ 371 (c)(1),
(2) Date: Aug. 4, 2023

(87) PCT Pub. No.: WO2022/173062

PCT Pub. Date: Aug. 18, 2022

(65) Prior Publication Data

US 2024/0036010 A1 Feb. 1, 2024

(30) Foreign Application Priority Data

Feb. 9, 2021 (JP) ................................ 2021-018817

(51) Int. Cl.
*G01N 29/06* (2006.01)

(52) U.S. Cl.
CPC ... *G01N 29/069* (2013.01); *G01N 2291/0231* (2013.01); *G01N 2291/0289* (2013.01)

(58) Field of Classification Search
CPC ......... G01N 29/069; G01N 2291/0231; G01N 2291/0289; G01N 29/0645;
(Continued)

(56) References Cited

U.S. PATENT DOCUMENTS 5,629,865 A 5/1997 Roth et al.
2009/0189278 A1 * 7/2009 Komatsu ............... G01N 29/11 257/729

(Continued)

FOREIGN PATENT DOCUMENTS

CN 108603862 A 9/2018
JP 2003-121426 A 4/2003

(Continued)

OTHER PUBLICATIONS

International Search Report, mailed Apr. 26, 2022, for International Application No. PCT/JP2022/008093.

(Continued)

*Primary Examiner* — Xin Y Zhong
(74) *Attorney, Agent, or Firm* — Baker Botts L.L.P.

(57) ABSTRACT

Provided is an ultrasonic inspection device and method capable of generating a clear image of a desired bonding interface without an S-Gate. The controller in the ultrasonic inspection device is configured to: (A) define a first gate indicating a time range in which a part of a reflected wave is extracted based on a predetermined condition received; (B) define one or more second gates each indicating a time width smaller than that of the first gate before an end time of the first gate; (C) for each of a plurality of measurement points of an inspection object, (C1) detect a lower layer echo or a local peak, (C2) adjust a reception time of the reflected wave based on the lower layer echo or the local peak; and (D) generate a cross-sectional image of the inspection object based on the reflected wave.

15 Claims, 13 Drawing Sheets

(58) Field of Classification Search
CPC ........... G01N 2291/044; G01N 29/043; G01N 29/4436; G01N 29/38; G01N 2291/2697
See application file for complete search history.

(56) References Cited

U.S. PATENT DOCUMENTS

| | | | | |
|---|---|---|---|---|
| 2019/0113480 | A1* | 4/2019 | Umeda ................ | G01N 29/221 |
| 2019/0265201 | A1* | 8/2019 | Sugawara .......... | G01N 29/4418 |

FOREIGN PATENT DOCUMENTS

| | | | |
|---|---|---|---|
| JP | 2009-175136 | A | 8/2009 |
| JP | 5507751 | B1 | 5/2014 |
| JP | 2017-129444 | A | 7/2017 |
| JP | 6608292 | B2 | 11/2019 |
| JP | 2020-091194 | A | 6/2020 |
| TW | 201713946 | A | 4/2017 |
| TW | 1735862 | B | 8/2021 |

OTHER PUBLICATIONS

Written Opinion, mailed Apr. 26, 2022, for International Application No. PCT/JP2022/008093 (without English translation).
Office Action, mailed Aug. 26, 2022, for Taiwanese Application No. 111108927 (without English translation).

* cited by examiner

ULTRASONIC INSPECTION DEVICE, ULTRASONIC INSPECTION METHOD, AND PROGRAM

TECHNICAL FIELD

The present invention relates to a non-destructive inspection device, and more particularly, to an ultrasonic inspection device, an ultrasonic inspection method, and a program for determining whether there is a defect such as a delaminated portion existing inside an inspection object such as an electronic component using ultrasonic waves and visualizing an internal state.

BACKGROUND ART

As a non-destructive inspection method for inspecting a defect from an image of an inspection object, an ultrasonic image is generated to specify a defect by irradiating the inspection object with an ultrasonic wave and detecting a reflected wave thereof. As another method, an X-ray image is generated to specify a defect by irradiating an inspection object with an X-ray and detecting an X-ray transmitted through a sample.

In general, in order to detect a defect existing in an inspection object having a multilayer structure using ultrasonic waves, reflection characteristics based on differences in acoustic impedance are used. The ultrasonic wave propagates into a liquid or solid substance, and a reflected wave (echo) is generated at a boundary surface or a gap between materials that are different in acoustic impedance. Here, a reflected wave from a defect such as a delaminated portion or a void has a higher intensity than a reflected wave from a defect free portion. Therefore, by converting a reflection intensity at a boundary surface of each layer of the inspection object, it is possible to obtain a cross-sectional image in which a defect existing in the inspection object becomes apparent.

As a method of generating a cross-sectional image using an ultrasonic inspection device, there is a method described in PTL 1 in addition to a method using an S-Gate and an F-Gate. The method described in PTL 1 has a means for collating reflected waves at respective measurement positions obtained from an inspection object having a complicated multilayer structure on the basis of features of local peaks, and associating local peaks corresponding to each other among all the reflected waves (S105 and S107 in PTL 1). In addition, the method described in PTL 1 has a means for, when one local peak is designated, generating images based on local peaks of all reflected waves associated with the designated local peak. Examples of feature amounts described in PTL 1 include a polarity (+ or −), a Z coordinate (z), a reflection intensity (f(z)), the number of local peaks (peak density) in the vicinity, and a cross-correlation function with a reference waveform. (See paragraph 0053) Thus, the method described in PTL 1 makes it possible to generate an image of a boundary surface even when a trigger point cannot be obtained by an S-Gate.

In addition, as another conventional technique in a case where a trigger point cannot be obtained, there is a method described in PTL 2. The method described in PTL 2 is to suppress missing a reflected wave from a target cross section by applying a trigger point obtained at a measurement position around a measurement position where no trigger point can obtained in an S-Gate set based on a surface roughness of an inspection object or the like.

CITATION LIST

Patent Literatures

PTL 1: JP 6608292 B2
PTL 2: JP 2015-83943 A

SUMMARY OF INVENTION

Technical Problem

In the method described in PTL 1, feature amounts of local peaks are calculated, and the local peaks are plotted in a space (feature space) with the feature amount as a coordinate axis. Thereafter, in the method, the plots are grouped. However, in this method, the feature amount is the axis of the space. This method is inconvenient because trial and error such as selection of feature amounts and adjustment of association standards continue to occur.

On the other hand, the method described in PTL 2 makes it possible to image a measurement position where a trigger point cannot be detected by an S-Gate. However, it is not possible to cope with a case where the difference in a reception time of an echo from the same boundary surface as the surface trigger point is not uniform between measurement points due to an uneven surface of a mold resin covering the test object.

Therefore, an object of the present invention is to provide an ultrasonic inspection device, an ultrasonic inspection method, and a program capable of generating a clear image of a desired bonding interface while suppressing a decrease in convenience without using an S-Gate that is difficult to appropriately set.

Solution to Problem

In order to solve the aforementioned problem, an ultrasonic inspection device includes:

an ultrasonic probe configured to generate an ultrasonic wave, transmit the ultrasonic wave to an inspection object, and receive a reflected wave from the inspection object; and a controller, in which the controller is configured to:

(A) define a first gate indicating a time range in which a part of the reflected wave is extracted based on a predetermined condition received from a user;

(B) define one or more second gates each indicating a time width smaller than that of the first gate before an end time of the first gate;

(C) for each of a plurality of measurement points of the inspection object, (C1) detect a lower layer echo or a local peak reflected from an interface of a lower layer than a top surface of the inspection object from the reflected wave corresponding to the measurement point, and (C2) adjust a reception time of the reflected wave based on the lower layer echo or the local peak; and (D) generate a cross-sectional image of the inspection object based on the reflected wave after the time adjustment and the second gate.

Advantageous Effects of Invention

According to the present invention, it is possible to provide a highly convenient ultrasonic inspection device, an ultrasonic inspection method, and a program capable of generating a clear image of a desired bonding interface without using an S-Gate that is difficult to appropriately set.

DESCRIPTION OF EMBODIMENTS

Figure 1:
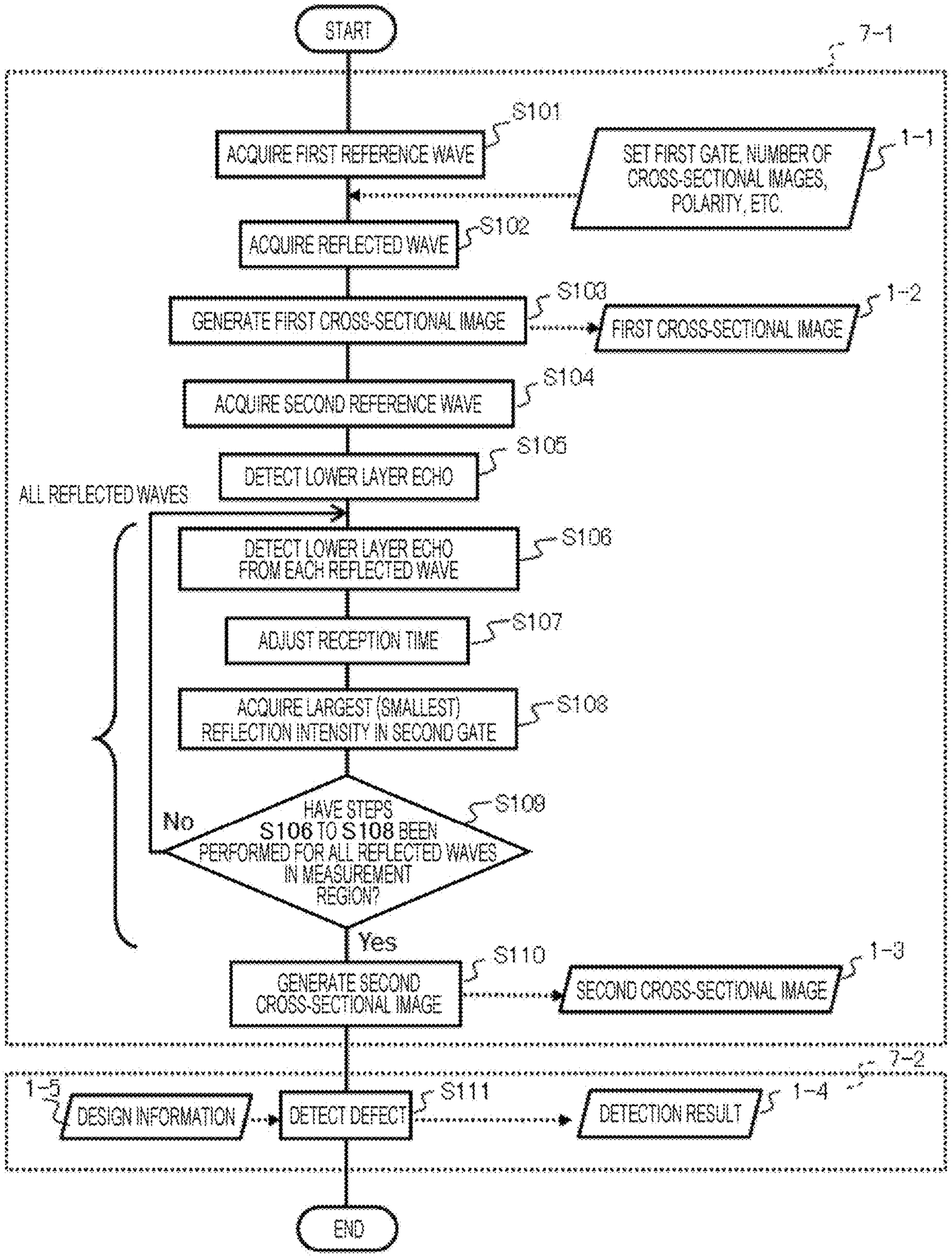
FIG. 1 is an example of a processing procedure of an ultrasonic inspection method.

An embodiment will be described below.

In the present example, an electronic component having a multilayer structure such as an IC chip is a main inspection target. In addition, in the present embodiment, even if there is a distortion of a reflected wave due to an uneven surface roughness or thickness of a sealing resin or a difference between vertical structures within a surface, an image of a bonding interface between dissimilar structures desired by a user is generated merely by receiving a simple condition. The present embodiment relates to an ultrasonic inspection device, an ultrasonic inspection method, and a program capable of detecting a bonding defect such as a minute delaminated portion or void. That is, in the present embodiment, echoes from a lower layer interface such as a bottom surface (lower layer interface echoes) are sequentially recognized by local peak levels with respect to all reflected waves obtained at measurement positions. Then, when reception times of the reflected waves obtained at the measurement positions are not misaligned with each other, the reception times are corrected. Further, an image is generated by defining a specific imaging gate having a narrow time width in a reception time zone before the lower layer interface echo. The present embodiment is particularly effective for non-destructive inspection of an inspection object using ultrasonic waves even when the inspection object has a complicated multilayer structure and a vertical structure that varies depending on a measurement position.

Hereinafter, the embodiment will be described with reference to the drawings. However, the present invention is not to be construed as being limited to the aspects described below. Those skilled in the art can easily understand that the specific configuration can be changed without departing from the spirit or gist of the present invention. Modifications will be described as variations at the end of the present specification.

Hereinafter, aspects of an ultrasonic inspection device, an ultrasonic inspection method, and a program according to the present embodiment will be described with reference to the drawings. In order to simplify the description, an inspection object having a multilayer structure formed by stacking a plurality of electronic devices such as a 2.5-dimensional or three-dimensional semiconductor packaging product will be described as an example.

First, when an ultrasonic wave is irradiated toward a surface of the inspection object, the ultrasonic wave propagates to the inside of the inspection object as a characteristic of the ultrasonic wave, and a part of the ultrasonic wave is reflected if there is a boundary surface with a change in material property (acoustic impedance). In particular, if there is a gap, most of the ultrasonic wave is reflected. Therefore, it is possible to generate an ultrasonic inspection image in which a defect such as a void or a delaminated portion becomes apparent by capturing a reflected wave from a desired heterogeneous boundary surface and converting an intensity thereof into an image. Hereinafter, the "boundary surface" may be referred to as an "interface". Further, the "position" may be referred to as a "place". Hereinafter, a defect at a heterogeneous bonding interface of a multilayer structure product will be described as a detection target.

<Ultrasonic Inspection Device>

Figure 2:
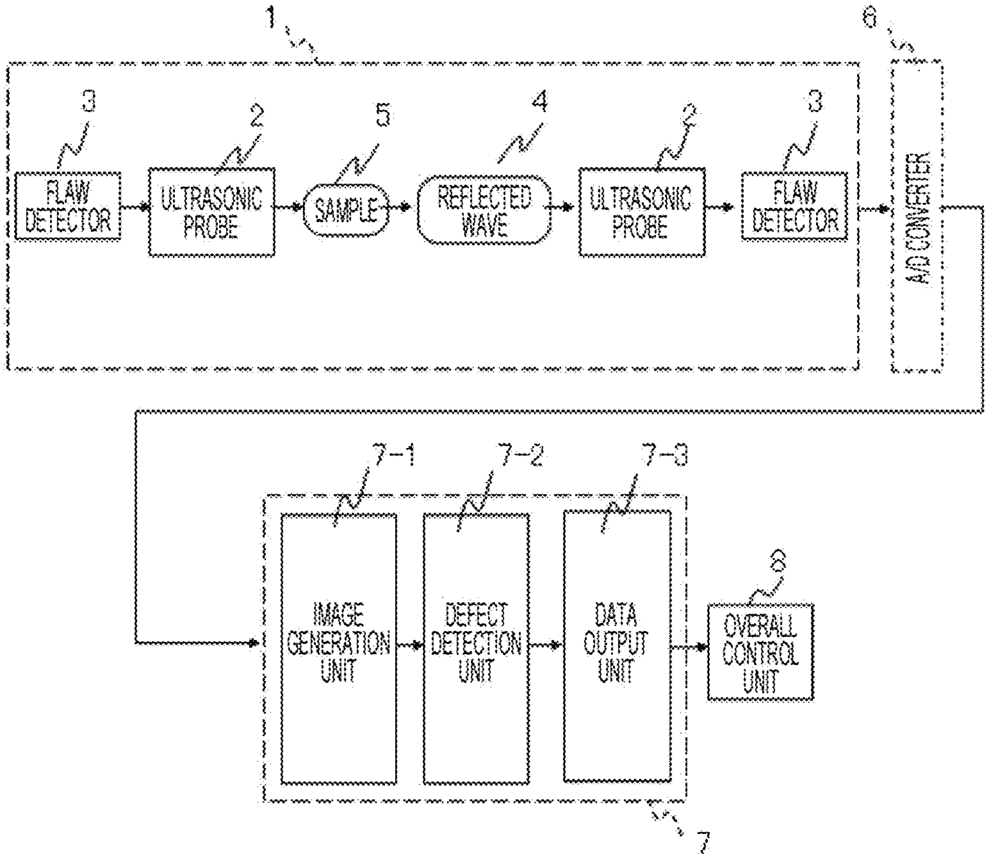
FIG. 2 is a block diagram illustrating a concept of an ultrasonic inspection device.

FIG. 2 is a conceptual diagram illustrating an aspect of an ultrasonic inspection device according to the present embodiment. The ultrasonic inspection device includes a detection unit 1, an A/D converter 6, a signal processing unit 7, and an overall control unit 8. The detection unit 1 includes an ultrasonic probe (an ultrasonic search element) 2 and a flaw detector 3. The flaw detector 3 drives the ultrasonic probe 2 by applying a pulse signal to the ultrasonic probe 2. The ultrasonic probe 2 driven by the flaw detector 3 generates an ultrasonic wave and transmits the ultrasonic wave to an inspection object (which may be referred to as a sample 5) via water.

When the transmitted ultrasonic wave is incident on the sample 5 having the multilayer structure, a reflected wave 4 is generated from a surface of the sample 5 or a heterogeneous boundary surface. In the present specification, the inspection object and the sample have the same mean. The reflected wave 4 is received by the ultrasonic probe 2 and converted into a reflection intensity signal by the flaw detector 3. Next, the reflection intensity signal is converted into digital waveform data by the A/D converter 6, and the digital waveform data is input to the signal processing unit 7. The ultrasonic waves are sequentially transmitted and received by performing scanning in the inspection region on the sample 5. For convenience of description, an ultrasonic wave generated by the ultrasonic probe 2 will be referred to as a "transmitted wave", and an ultrasonic wave received by the ultrasonic probe 2 will be referred to as a "reflected wave". In addition, the "reflected wave" may be appropriately referred to as a "reflected ultrasonic wave".

The signal processing unit 7 appropriately includes an image generation unit 7-1, a defect detection unit 7-2, and a data output unit 7-3. The image generation unit 7-1 performs signal processing, which will be described later, on the waveform data input from the A/D converter 6 to the signal processing unit 7. By performing this processing, the image generation unit 7-1 generates a cross-sectional image of a specific bonding surface of the sample 5 from the digital waveform data. The defect detection unit 7-2 performs image processing, which will be described later, in the cross-sectional image of the bonding surface generated by the image generation unit 7-1. By performing this processing, the defect detection unit 7-2 detects a defect such as a delaminated portion or a void. The bonding surface having a delaminated portion or a void becomes the above-mentioned heterogeneous boundary surface, from which the reflected wave 4 is generated, so that the defect can be detected. In addition, the data output unit 7-3 generates data to be output as an inspection result such as information about each defect detected by the defect detection unit 7-2 or an image for observation of cross-section, and outputs the data to the overall control unit 8.

Figure 3:
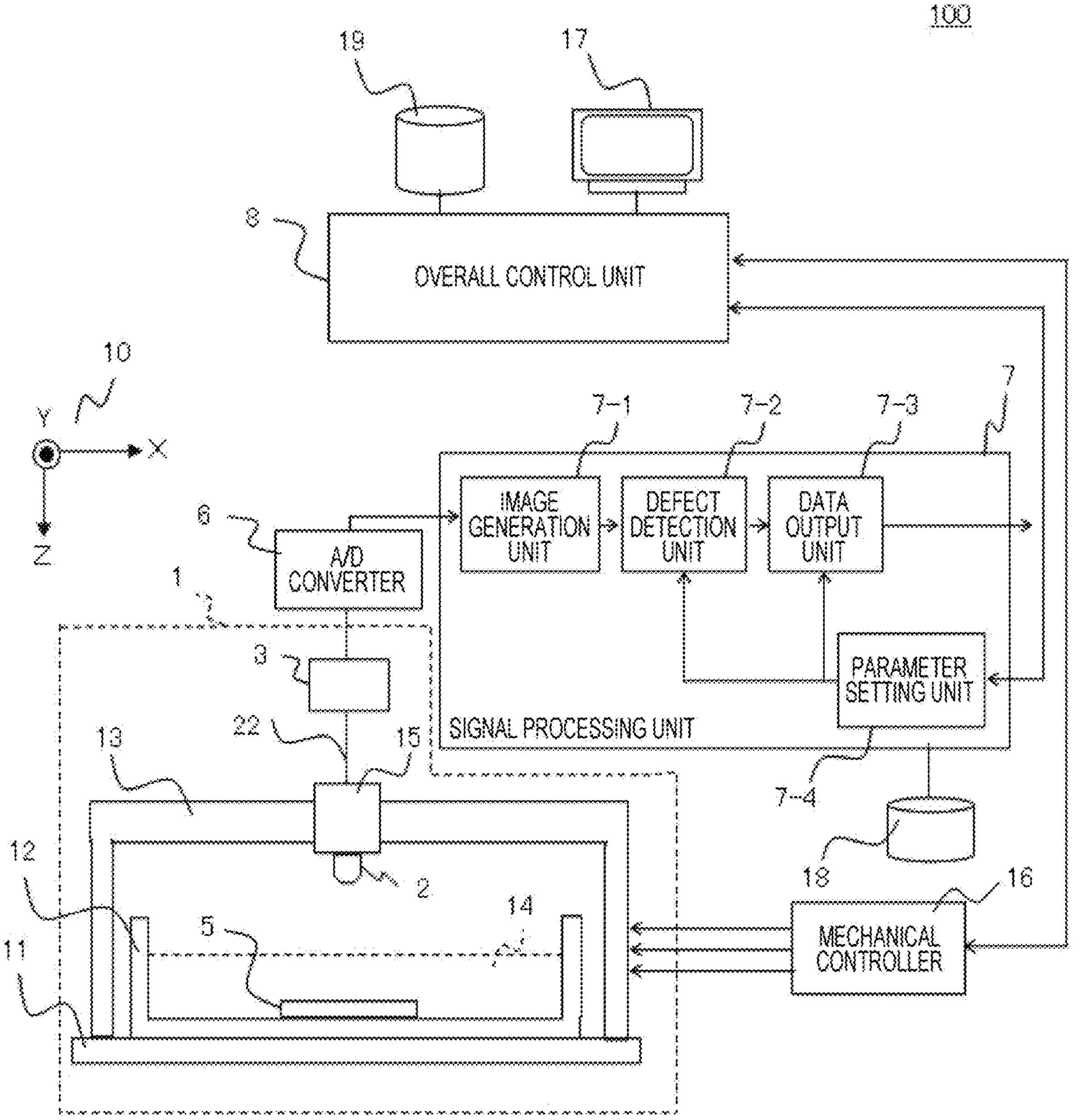
FIG. 3 is a block diagram illustrating a schematic configuration of the ultrasonic inspection device.

Next, FIG. 3 illustrates a schematic diagram of a specific configuration example of an ultrasonic inspection device 100 that realizes the configuration illustrated in FIG. 2. In FIG. 3, reference sign 10 denotes a coordinate system of three orthogonal axes of X, Y, and Z.

Reference sign 1 in FIG. 3 corresponds to the detection unit 1 described with reference to FIG. 2. In the detection unit 1, reference sign 11 indicates a scanner table, and 12 indicates a water tub provided on the scanner table 11. In addition, reference sign 13 denotes a scanner provided on the scanner table 11 in such a manner as to straddle the water tub 12 and movable in the X, Y, and Z directions. The scanner table 11 is a table installed substantially horizontally (on a plane parallel to an XY plane). The Z axis is an axis along the gravity direction.

Water 14 is injected into the water tub 12 to a height indicated by a dotted line, and the sample 5 is placed on the bottom (under water) of the water tub 12. As described above, the sample 5 is a packaging product having a multilayer structure or the like. The water 14 is a medium necessary for an ultrasonic wave emitted from the ultrasonic probe 2 to efficiently propagate to the inside of the sample 5. Reference sign 16 denotes a mechanical controller.

The ultrasonic probe 2 transmits an ultrasonic wave from an ultrasonic emission portion at a lower end thereof to the sample 5, and receives a reflected wave returned from the sample 5. The ultrasonic probe 2 is attached to a holder 15, and is freely movable in the X, Y, and Z directions by the scanner 13 driven by the mechanical controller 16. As a result, the ultrasonic probe 2 receives reflected waves at a plurality of measurement points of the sample 5 previously received from the user (or selected by the signal processing unit 7) while moving in the X and Y directions. Then, a two-dimensional image of a bonding surface in the measurement region (XY plane) can be obtained, and the bonding surface can be inspected for defects. The ultrasonic probe 2 is connected to the flaw detector 3 that converts a reflected wave into a reflection intensity signal via a cable 22. Note that the two-dimensional image obtained by the ultrasonic inspection device 100 can be said to be a cross-sectional image at a specific depth Z, or can be said to be a cross-sectional image along the XY plane. In the following description, a "cross section along the aaa plane" may be abbreviated as a cross section [aaa]. For example, a cross section along the XY plane is a "cross section [XY]".

The ultrasonic inspection device 100 further includes the A/D converter 6, the signal processing unit 7, the overall control unit 8, and the mechanical controller 16 described with reference to FIG. 2.

The signal processing unit 7 is a processing unit that processes the reflection intensity signal subjected to A/D conversion by the A/D converter 6 to detect an internal defect of the sample 5. The signal processing unit 7 includes an image generation unit 7-1, a defect detection unit 7-2, a data output unit 7-3, and a parameter setting unit 7-4.

The image generation unit 7-1 generates an image from digital data obtained from the A/D converter 6. The digital data is obtained by A/D converting, using the A/D converter 6, reflected waves that have returned from the surface and heterogeneous boundary surfaces in the measurement region [XY] of the sample 5 received from the user and received by the ultrasonic probe 2. The defect detection unit 7-2 processes the image generated by the image generation unit 7-1 to make apparent or detect an internal defect. The data output unit 7-3 outputs an inspection result in which the internal defect is made apparent or detected by the defect detection unit 7-2. The parameter setting unit 7-4 receives a parameter such as a measurement condition input from the outside (e.g., a user who operates a user interface unit), and sets the parameter in the image generation unit 7-1 and the defect detection unit 7-2. Then, in the signal processing unit 7, for example, the parameter setting unit 7-4 is connected to a database 18.

The overall control unit 8 receives a parameter (corresponding to a condition to be described later) from the user. In addition, the overall control unit 8 appropriately connects a user interface unit 17 that displays information such as a reflected ultrasonic wave, an image of a defect detected by the signal processing unit 7, the number of defects, and coordinates and a dimension of each defect, and a storage device 19 that stores a feature amount and an image of a defect detected by the signal processing unit 7. The mechanical controller 16 drives the scanner 13 based on a control command from the overall control unit 8. The signal processing unit 7, the flaw detector 3, and the like are also driven according to a command from the overall control unit 8.

Note that hardware configurations of the signal processing unit 7, the overall control unit 8, and the mechanical controller 16 will be described later with reference to FIG. 13. Note that, each of the signal processing unit 7, the overall control unit 8, and the mechanical controller 16 may be formed by separate hardware as illustrated in FIG. 3, or all of the signal processing unit 7, the overall control unit 8, and the mechanical controller 16 may be integrated in common hardware. Alternatively, the signal processing unit 7 and the overall control unit 8 may be integrated in common hardware without integrating the mechanical controller 16. Note that, in the following description, hardware including at least one of the signal processing unit 7, the overall control unit 8, and the mechanical controller 16 may be simply referred to as a "controller", regardless of whether they are integrated.

<Sample>

Figure 4:
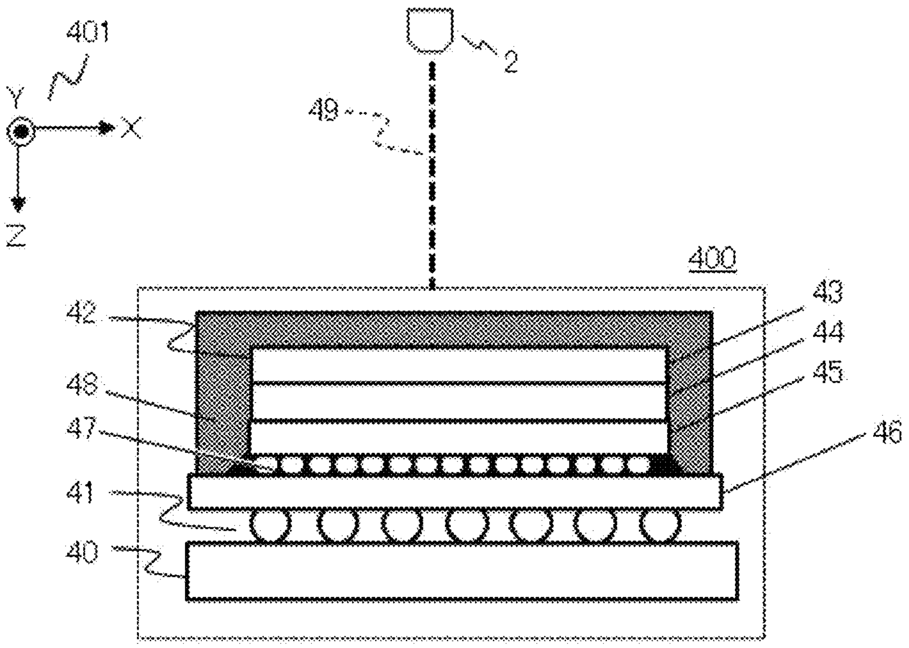
FIG. 4 is a schematic diagram of a vertical structure of a semiconductor package having a multilayer structure, which is an example of an inspection object.

FIG. 4 is a diagram illustrating an inspection object 400 as an example of the sample 5. The inspection object 400 is an electronic component having a multilayer structure, which is a main inspection target. In this drawing, a vertical structure of the electronic component is schematically illustrated. As described above, in the present specification, the inspection object has the same meaning as the sample. Reference sign 401 denotes a coordinate system of three orthogonal axes of X, Y, and Z. The coordinate system 401 is the coordinate system 10 in FIG. 3. The inspection object 400 is obtained by bonding a semiconductor device 42 onto a printed wiring board 40, which is a lowermost layer, via solder balls 41. The semiconductor device 42 is formed by stacking a plurality of chips (here, three chips 43, 44, and 45)

and connecting them to an interposer board 46 via a bump layer 47. Mold underfilling for sealing the periphery of the bump layer 47 with a liquid sealing material (an underfill material, a black portion in the drawing) is performed. In addition, over-molding for entirely sealing the semiconductor device with a resin 48 (a shaded portion in the drawing) is performed, and the semiconductor device is protected from the outside. When an ultrasonic wave 49 is incident from the surface side (the upper side in the drawing) of the inspection object 400, the ultrasonic wave 49 propagates to the inside of the inspection object 400. The ultrasonic wave 49 is reflected from a surface of the resin 48, boundary surfaces between the chips 43, 44, and 45, and a place having a difference in acoustic impedance represented by the bump layer 47, and these reflected waves are received as one reflected wave by the ultrasonic probe 2.

<Details of Problem of S-Gate and F-Gate Method>

Figure 5:
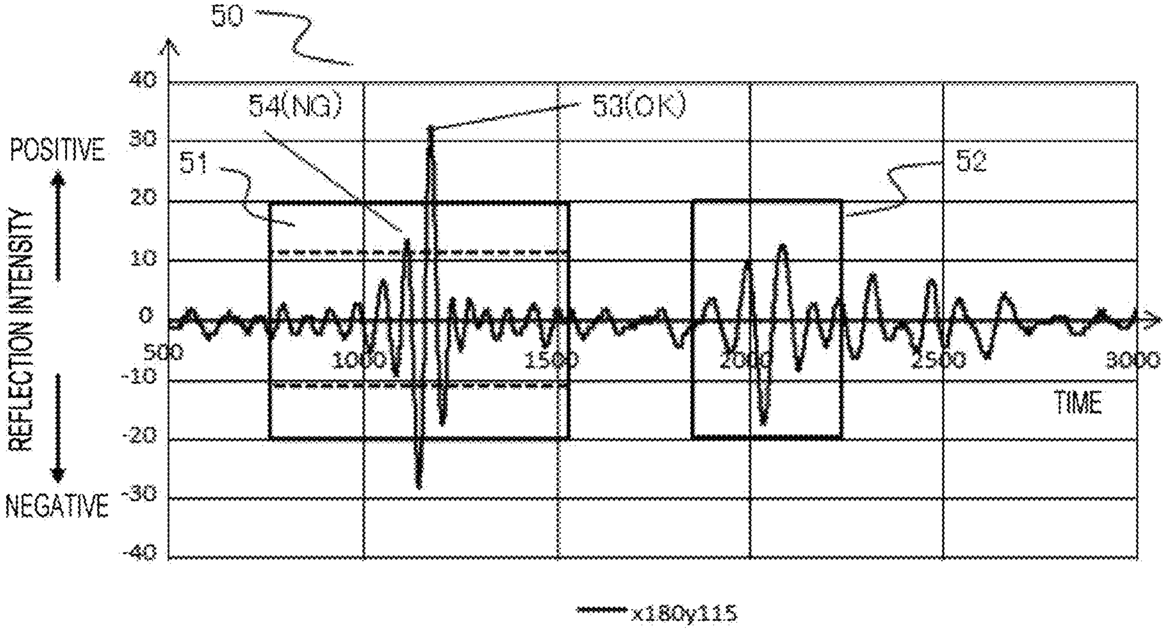
FIG. 5 is a diagram illustrating an example in which an S-Gate and an F-Gate are defined.
Figure 5:
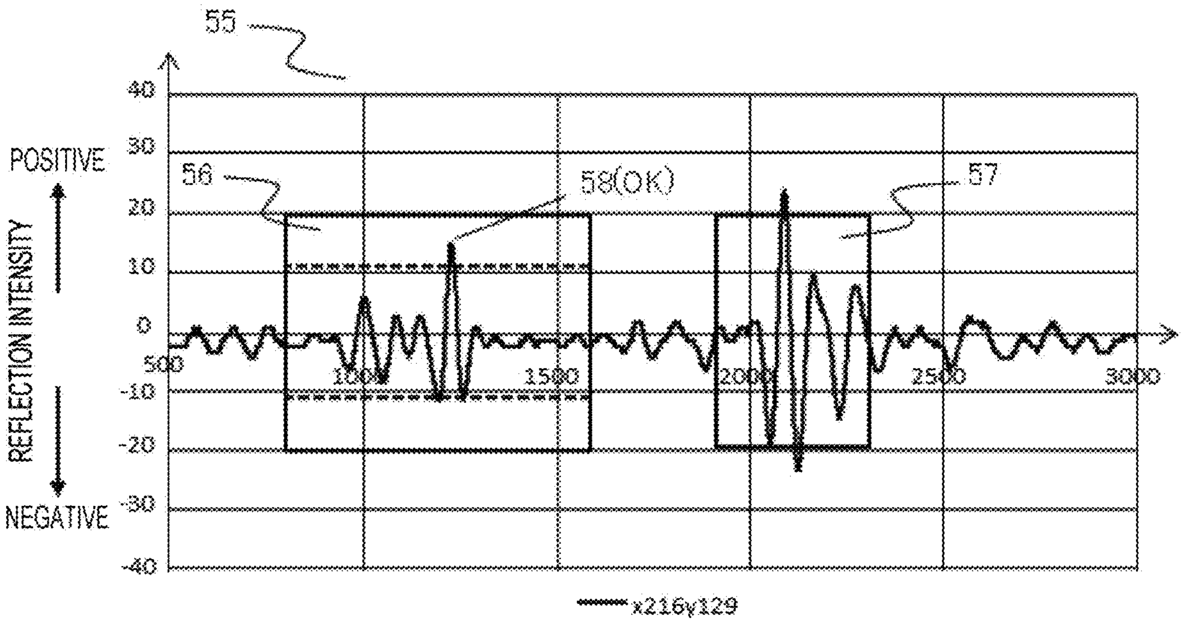

FIG. 5 is a diagram illustrating a problem of an S-gate and F-gate method. Note that, hereinafter, when the subject is omitted, the signal processing unit 7 is the processing subject.

Reference signs 50 and 55 in FIG. 5 are examples of reflected waves received by the ultrasonic probe from different measurement points of the inspection object 400 illustrated in FIG. 4. Reference signs 50 and 55 denote ultrasonic waveforms when the horizontal axis represents a reception time (path length) and the vertical axis represents a reflection intensity (peak value). Note that, in graphs of reflected waves in FIGS. 6 to 11 as well as FIG. 5, the vertical axis and the horizontal axis also represent the same. The reception time may refer to a time at which the ultrasonic probe receives an ultrasonic wave, or may be a time at which another component of the ultrasonic inspection device receives a reflected ultrasonic wave (or digital or analog data based on the reflected wave). Assuming that speeds at which an ultrasonic wave move through the respective components inside the sample 5 are approximately equal, the reception time indicates a depth (which can also be said to be a position in the Z-axis direction) of the inspection object 400. The reflection intensity plotted on the vertical axis is 0 at the center of the vertical axis. With respect to the center of the vertical axis, the upward direction indicates a positive polarity and the downward direction indicates a negative polarity. In the reflected wave, peaks having different polarities appear alternately. Hereinafter, each peak will be referred to as a local peak. In a general gate control method, first, a condition is received from a user, and an S-Gate 51 (56), which is a gate for detecting a reflected wave from a surface, is defined. Then, in a time range of the S-Gate, a timing at which a peak exceeding a threshold occurs for the first time (which may hereinafter be referred to as a trigger point) is detected from the reflected wave (surface echo) from the surface.

Note that not only a part (which may be a pinpoint or a section) of the reflected wave may be referred to as an "echo" in the present specification, not limited to the S-gate and F-gate method. Furthermore, a part of the reflected wave reflected (or "considered as reflected") from a specific portion (a surface, an interface, a defect, a lower layer, a bottom surface) of the sample 5 may be referred to as an echo (e.g., a surface echo, an interface echo, or a defect echo) to which the name of the specific portion is added at the beginning.

In addition, as described above, in the present specification, the term "gate" will be used for description, but its meaning is "a range defined on a time axis for extracting a defect echo or the like from a reflected wave".

The description will return to the details of the problem of the S-gate and F-gate method. Next, an imaging gate (52 or 57 in the drawing) is defined in a time range delayed from the trigger point by a time received from the user. The imaging gate may be referred to as an F-Gate. Then, in the F-Gate 52 or 57, a largest reflection intensity is detected when the polarity received from the user is positive, and a smallest reflection intensity is detected when the polarity received from the user is negative. While this is regarded as an echo of a bonding interface, which is an inspection target, an inspection image is generated based on an absolute value of the detected largest or smallest reflection intensity. That is, a reflected wave from an interface on a layer lower than the surface by a certain distance is captured by the F-Gate 52 and 57 to generate an image.

In order to perform such processing, the height of the S-Gate is important. This is because the height of the S-Gate is a threshold for specifying the trigger point described above. However, when the threshold is defined as a height indicated by broken lines in 51, in the reflected wave 50, a peak 54 (NG) before a largest-intensity peak 53 (OK) to be detected is erroneously detected as a surface echo. On the other hand, when the threshold is defined as a height of the S-Gate indicated by solid lines in 51 to avoid erroneous detection, a correct surface echo 58 (OK) is missed in the reflected wave 55. As described above, the reason why the intensity of the surface echo varies depending on the measurement point is that the irradiation wave is scattered on the surface due to an uneven roughness of the mold surface. Therefore, it can be seen that it is difficult to adjust the height of the S-Gate. If the surface echo is erroneously detected, the F-Gate 52 or 57 is defined in a wrong time range (depth), and an image with the wrong depth is generated.

In the S-gate and F-gate method, the image generation unit 7-1 of the signal processing unit 7 repeats the following processing to generate an image of a bonding interface at a certain depth from the surface.

(A1) A trigger point is calculated from each reflected wave 4 obtained by performing scanning in a measurement region (an XY plane).

(A2) An F-Gate is set in a time range delayed by a certain time (a time received from the user).

(A3) From the range of the F-Gate, a local peak that matches a polarity received from the user and has a largest absolute value of a peak value is selected.

(A4) The absolute value of the peak value is converted into a gray value (for example, when a 256-gradation image is generated, the gray value is a value in the range of 0 to 255, and the gray value is 0 if the absolute value is 0).

The processing has been described above. Note that, in the present specification, an example of the "detection" of the local peak is to "select" or "specify" a point or a time point satisfying a condition from an original reflected wave.

As described above, the conventional gate control method is based on the premise that the distance from the surface to the boundary surface between the chips is uniform and the surface echo is stably obtained as shown by 400 in FIG. 4. However, in practice, as described above, the peak value of the surface echo fluctuates greatly according to the surface of the sample 5, and it may be difficult to stably obtain an image of a desired bonding interface.

In addition, in recent years, as the downsizing and the thinning of electronic components progress, internal structures are also thinned, and reflected waves from various different types of interfaces are received close to each other on the time axis. Therefore, when the F-Gate is defined in a time range such as 52 or 57 in FIG. 5, reflected signals from a plurality of interfaces are mixed in the F-Gate, and a reflected signal of a wrong interface is detected.

In the method according to the present embodiment to be described below, even in such a situation, an image of a desired interface can be easily generated without requiring the user to set a complicated S-Gate.

<Processing According to Present Embodiment>

Hereinafter, processing according to the present embodiment will be described.

FIG. 1 is an example of a flowchart illustrating a processing procedure of an ultrasonic inspection method according to the present embodiment. FIG. 3 will be appropriately referred to. Note that processing in S101 to S111 is processing performed by the signal processing unit 7. In a case where the signal processing unit 7 includes the units 7-1 to 7-4 illustrated in FIG. 3, each of the units is a subject of processing a corresponding step as follows.

Image generation unit 7-1: S101 to S110

Defect detection unit 7-2: S111

Data output unit 7-3: Display of image 1-2, image 1-3, and detection result 1-4. More precisely, the processing in these steps is processing of receiving information from each unit and transmitting the information to the overall control unit 8 to display the information on the user interface unit 17.

Parameter setting unit 7-4: Reception of condition 1-1, reception of design information 1-5, and transmission of received information to each unit However, the processing subjects and the steps are not limited to the above-described example.

(S101) First, the detection unit 1 irradiates a sample with an ultrasonic wave, and acquires a first reference wave that is a reflected wave thereof. The first reference wave is acquired from a certain position in a measurement region. The first reference wave may be acquired from at least one place on the XY plane in the measurement region. The acquired first reference wave is displayed on user interface unit 17.

Based on the first reference wave, condition 1-1 is received as a condition for generating a first cross-sectional image, which will be described later. The reception is performed when the user who has visually recognized the first reference wave inputs the condition 1-1 to the user interface unit 17. The condition 1-1 stores, for example, a first gate (time range), and the number of cross-sectional images to be generated, a polarity of an echo for generating images, etc. as conditions for generating second cross-sectional images, which will be described later. Here, concerning the end time of the gate, it is preferable that a second gate, which will be described later, is defined before the first gate on the time axis, and is in a time range narrower than the first gate. For the user, the first gate may be regarded as a means for inputting to the signal processing unit 7 a time range in which a plurality of cross-sectional images (second cross-sectional images, which will be described later) are generated. Note that the condition 1-1 is an example of the above-described parameter.

Figure 6:
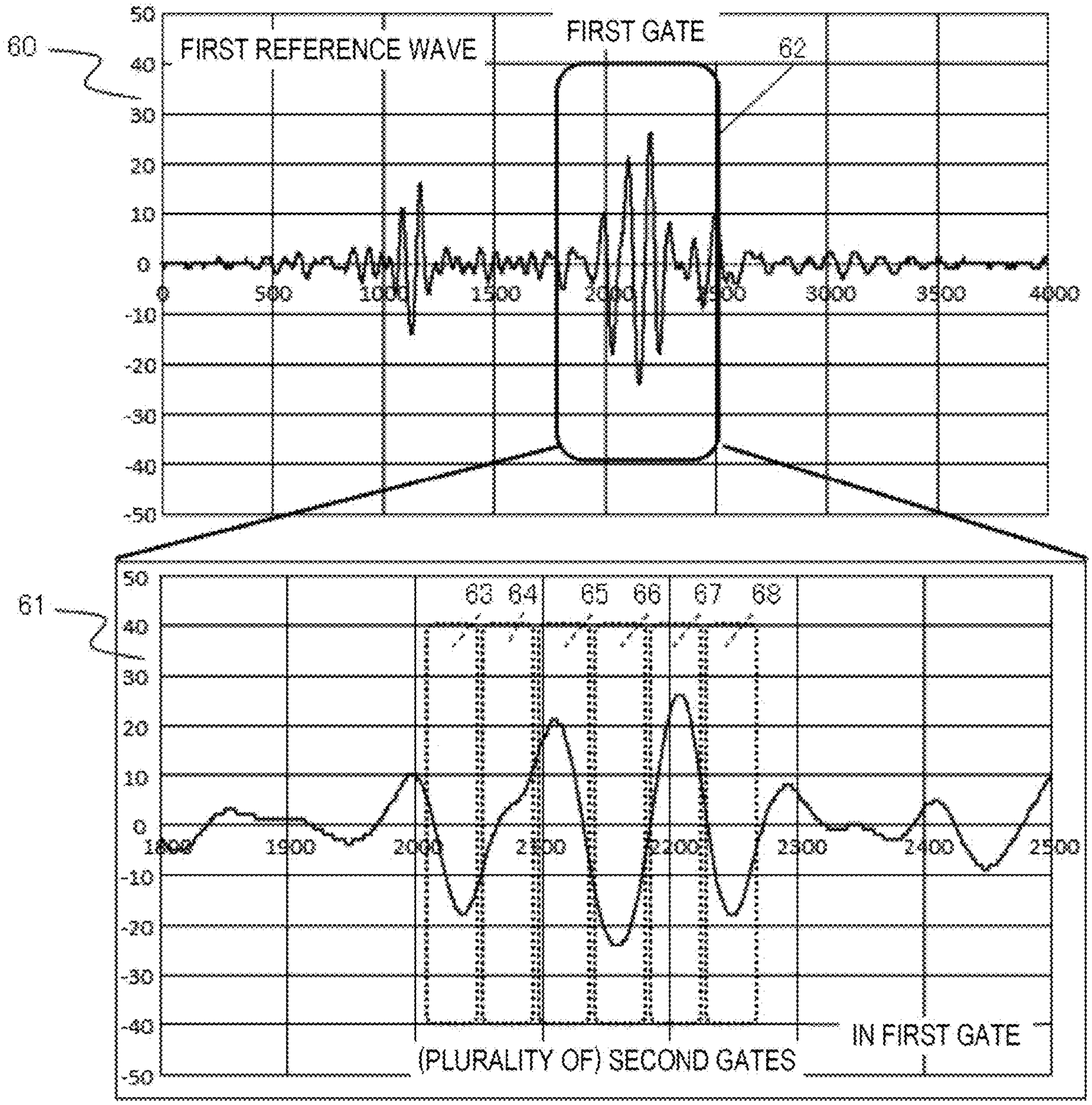
FIG. 6 is an example in which first and second gates are defined.

FIG. 6 is a diagram illustrating a first gate and a second gate.

In FIG. 6, reference sign 60 denotes an example of a first reference wave, reference sign 62 denotes a first gate defined based on the first reference wave, reference sign 61 denotes an enlarged first reference wave in the first gate, and reference signs 63 to 68 denote examples of second gates. The first gate 62 is a gate for generating a first cross-sectional image, which will be described later. The second gates 63 to 68 are gates for generating second cross-sectional images, which will be described later. In the example of FIG. 6, six second gates 63 to 68 are defined, which indicates that six second cross-sectional images are generated. In the present example, the first gate 62 is defined as having a wide time width to include a plurality of local peaks. The six second gates 63 to 68 are defined by the signal processing unit 7 as each having a time width shorter than that of the first gate to include about one local peak. In this case, the number of second gates 63 to 68 is determined according to the number of cross-sectional images in the condition 1-1 of FIG. 1. As illustrated in FIG. 6, the second gates 63 to 68 are defined before the end time of the first gate 62. The time width of each of the second gates 63 to 68 is equal to or less than one wavelength of the ultrasonic wave applied to the sample.

In the following description, it will be assumed that the time widths of the individual second gates are equal, and the second gates fill the time range of the first gate while not overlapping each other. However, as illustrated in FIG. 6, a predetermined time range from the start time and the end time of the first gate may not correspond to the second gates. In this case, the predetermined time range may be received from the user as the condition 1-1. In the following description, an example will be described, in which the time range of the second gate is not directly received from the user, but is defined on the basis of the number of cross-sectional images or the like. Other examples will be described in variations.

The description returns to FIG. 1.

(S102) In FIG. 1, based on the received condition 1-1, a reflected ultrasonic wave (which will hereinafter be appropriately abbreviated as a reflected wave) is acquired from each measurement point while performing scanning in the measurement region, and is stored in the database 18 (see FIG. 3).

(S103) Then, a first cross-sectional image 1-2 is generated with an absolute value of a largest reflection intensity (when a detection polarity (hereinafter simply referred to as a polarity) received from the user is positive) or a smallest reflection intensity (when the polarity received from the user is negative) in the first gate. The first cross-sectional image 1-2 is a cross-sectional image for determining a reference position. At this time, imaging is performed only based on the first gate corresponding to the F-Gate without using the S-Gate as illustrated in FIG. 5.

(S104) Next, based on the change in gradation in the generated first cross-sectional image 1-2, a specific measurement position (hereinafter referred to as a position U) is selected, and a second reference wave from the selected measurement position is acquired from the database 18. The measurement position where the second reference wave is acquired is preferably a place where the gray value is high (close to white) with a small change in gradation in the periphery thereof in the first cross-sectional image 1-2.

It is preferable that the signal processing unit 7 measures a change in gradation in the image based on the first cross-sectional image 1-2 and determines a place where the change is small as a place (hereinafter referred to as a position U) where the second reference wave is to be obtained. The following method is an example of a method of measuring a change in gradation for determining a position U.

(B1) A place where a gray value f(x,y) of each position (x,y) in the first cross-sectional image 1-2 is higher than a threshold Th (B2) A place where σ is smallest when calculated, σ being a standard deviation of gray values f(x+L, y+M)(L, M=−N to N) of (N+1)×(N+1) pixels including an own pixel and pixels in the vicinity thereof The position U is a place satisfying the above-described (B1) and (B2).

(S105) Next, a reflected wave from a lower layer, that is, a lower layer echo is detected from the second reference wave. The lower layer echo is preferably an echo from an interface (hereinafter referred to as a common lower layer interface) of the lower layer commonly existing over a wide range (or the entirety) of the measurement region on the XY plane. As an example of the lower layer, a bottom surface of the printed wiring board (40 in FIG. 4), a bottom surface of the interposer board (46 in FIG. 4), or the like may be considered, but another structure may be used. The lower layer echo includes one local peak, and is specified in the first gate of the second reference wave. More specifically, the signal processing unit 7 may perform processing of selecting a local peak of which a reflection intensity has the largest absolute value among local peaks of the second reference wave included in the first gate, and detecting a time range for a second gate width as a lower layer echo.

Figure 7:
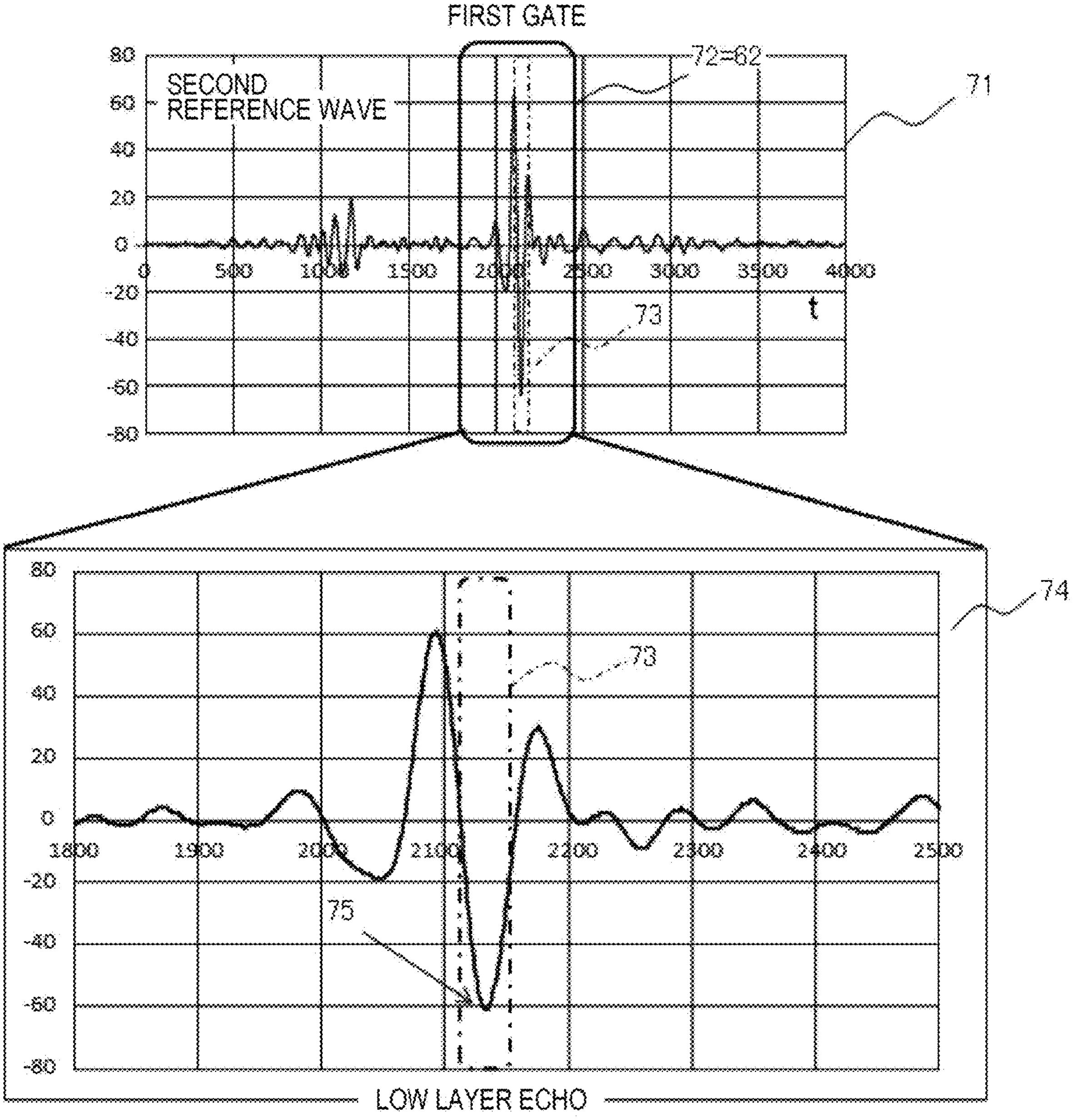
FIG. 7 is a diagram illustrating a lower layer echo and a local peak in a second reference wave.

FIG. 7 is a diagram illustrating an example of a lower layer echo.

In FIG. 7, reference sign 71 denotes an example of a second reference wave, and reference sign 72 denotes an example of a first gate. Here, the time range of the first gate 72 is the same as that of the first gate (62 in FIG. 6) in the first reference wave. Reference sign 73 denotes a lower layer echo detected by the signal processing unit 7. In the drawings of the present specification, a gate is indicated by a square with rounded corners (a solid line), and an echo is indicated by a square with rounded corners (an alternate long and short dash line). In the following description, it is assumed that the time width of the lower layer echo 73 is the same as the second gate width. Reference sign 74 denotes an enlarged second reference wave in the first gate 72 of 71, and reference sign 75 denotes a local peak selected as the center of the lower layer echo.

Note that, as a method of detecting a lower layer echo from the second reference wave 71, for example, the following may be considered.

In the second reference wave 71, a local peak that is latest on the time axis is selected from among peak intensities equal to or higher than a predetermined standard. Then, a time range between a time obtained by subtracting half of the second gate width from the latest local peak and a time obtained by adding half of the second gate width to the latest local peak is defined as a lower layer echo 73. (Case where "lower layer"=bottom surface of sample 5)

A time range in which the lower layer echo is detected is received from the user as a part of the condition 1-1. Then, in the time range, a local peak is selected on the basis of a predetermined standard (e.g., a local peak having a peak intensity equal to or higher than a predetermined standard, a local peak having a peak intensity of which an absolute value is largest, or a local peak that is latest or earliest on the time axis). Then, a time range between a time obtained by subtracting half of the second gate width from the latest local peak and a time obtained by adding half of the second gate width to the latest local peak is defined as a lower layer echo 73. (Case where "lower layer"=boundary surface higher than bottom surface of sample 5) According to the processing to be described later in the chapter <Propagation of Lower Layer Echo> with reference to FIG. 8, the time range needs to be designated only for the second reference wave 71, and therefore, high convenience can be maintained. Furthermore, the width of the time range may be a width of a lower layer echo 83 used in FIG. 8 and <Propagation of Lower Layer Echo>.

The detection method has been described above. Note that the lower layer echo in the second reference wave 71 may be changed by the user after being detected according to the above-described detection method.

The description returns to FIG. 1.

(S106) Next, the reflected ultrasonic wave obtained from each measurement point is read from the database 18, and a lower layer echo is detected from each read reflected wave on the basis of the lower layer echo (corresponding to the second reference wave) detected in S105. This processing can also be said to detect the lower layer echo (more specifically, a local peak) derived from the common lower layer interface in the second reference wave from a reflected ultrasonic wave at another measurement point. However, each reflected wave to be processed in S106 does not necessarily include a local peak used to specify a lower layer echo at the pinpoint time. This is because, for example, the surface height (in the Z-axis direction) of the sample 5 is originally non-uniform, or a difference in material between the components included in the sample 5 may cause a difference between times taken for ultrasonic waves to reach and be reflected from structures that are generation sources of local peaks even if the structures are located at the same depth from the surface at a plurality of measurement points. A method of coping with this problem will be described below.

<Propagation of Lower Layer Echo>

Figure 8:
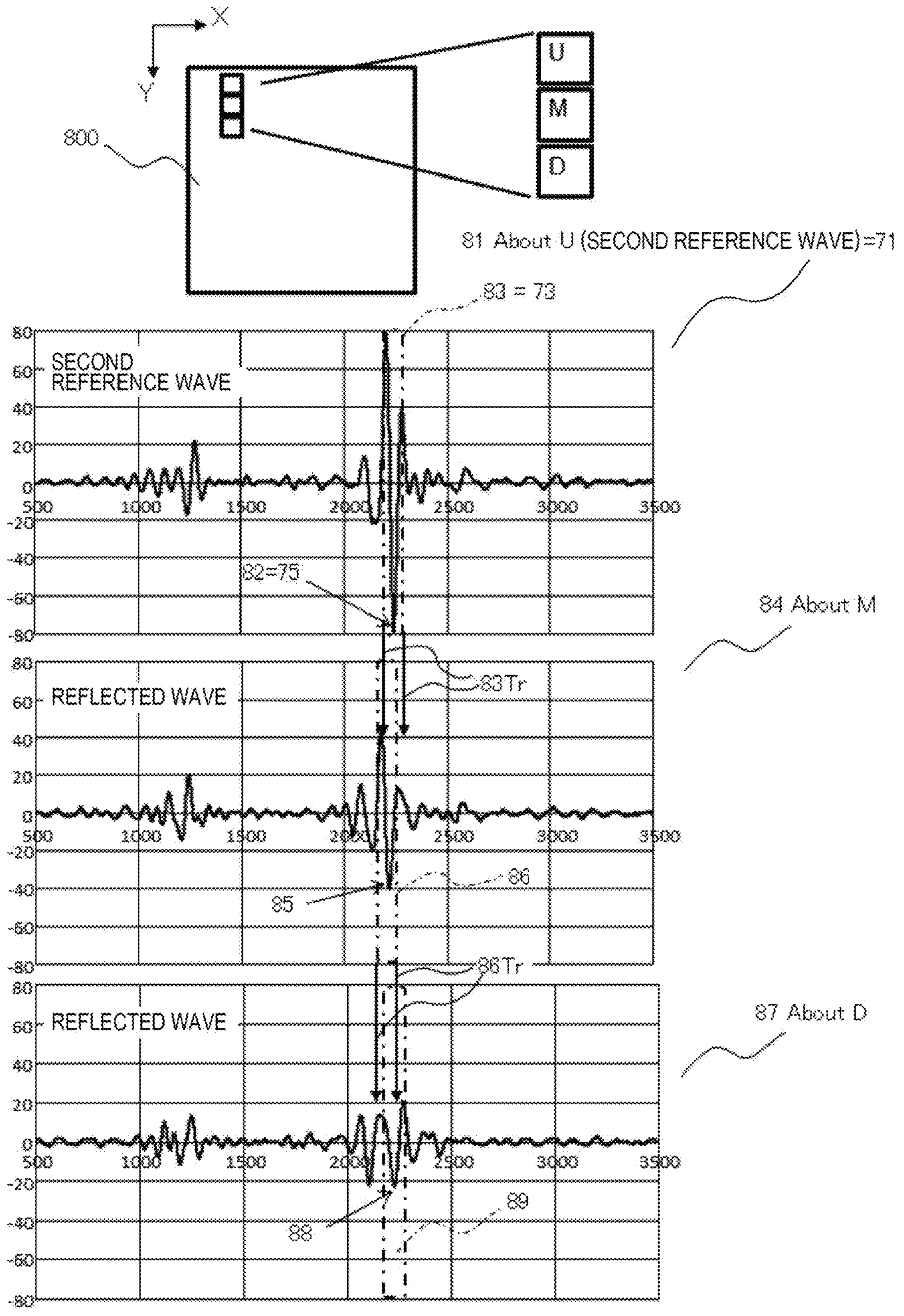
FIG. 8 is an example of processing of propagating a local peak and a lower layer echo.

FIG. 8 illustrates an example of processing of detecting a lower layer echo. Note that this drawing is directed to a reflected ultrasonic wave other than the second reference wave. Reference sign 800 denotes an XY measurement region surface (that is, a surface to be scanned) of the sample 5, and positions U, M, and D denote measurement points. The measurement point may be referred to as a "measurement position" or a "measurement place". In addition, in the following description, a case where each of the measurement points U, M, and D corresponds to one pixel in an output image will be described. Other countermeasures will be described in variations.

Reference sign U denotes a position of the sample 5 where the second reference wave is measured. Reference sign 81 denotes a second reference wave acquired from the measurement point U. Reference sign 82 denotes a local peak selected in S105, and reference sign 83 denotes a lower layer echo detected in S105. Reference signs 81, 82, and 83 correspond to reference signs 71, 75, and 73 in FIG. 7, respectively. Reference signs 84 and 87 denote reflected waves obtained from the measurement point M adjacent to the measurement point U and the measurement point D adjacent to the measurement point M.

In order to detect lower layer echoes from here, the time range of the lower layer echo 83 detected from the second reference wave 81 is propagated from the measurement point U sequentially to the adjacent measurement point M and further to the measurement point D adjacent to the measurement point M. As a result, the lower layer echo is also detected from each of the reflected waves 84 and 87 other than the second reference wave.

More specifically, referring to FIG. 8, as indicated by an arrow pair 83Tr, the time range of the lower layer echo 83 specified from the second reference wave 81 is propagated to the reflected wave 84. The region below the arrow pair 83Tr is the propagated time range. The signal processing unit 7 detects a lower layer echo 86 of the reflected wave 84 around a local peak 85 existing in the time range propagated to the reflected wave 84. Note that, in this drawing, an example is illustrated in which the lower layer echo 86 is detected in a time range between a time obtained by subtracting half of the width of the lower layer echo 83 from the local peak 85 and a time obtained by adding half of the width of the lower layer echo 83 to the local peak 85. In addition, in the example of FIG. 8, the times of the local peaks are misaligned with each other between the second reference wave 81 and the reflected wave 84, and as a result, the propagated time range and the newly detected lower layer echo 86 are misaligned with each other although partially overlapping each other.

Next, the reflected wave 87 will be described. As indicated by an arrow pair 86Tr, the specified time range of the lower layer echo 86 is propagated to the reflected wave 87. The signal processing unit 7 detects a lower layer echo 89 of the reflected wave 87 around a local peak 88 existing in the time range propagated to the reflected wave 87. The detection method is similar to the method of detecting the reflected wave 84.

By repeating this processing, the lower layer echo is further propagated to an adjacent reflected ultrasonic wave. That is, the lower layer echo is recognized in the adjacent reflected ultrasonic wave. The same processing is performed on all of the reflected ultrasonic waves by propagating the lower layer echo sequentially to the measurement points spaced apart from each other in the XY measurement region surface. In the example of FIG. 8, propagation is performed from the top to the bottom in the XY measurement region of 800, but it is also possible to improve recognition accuracy by performing propagation in four directions from the top to the bottom, from the bottom to the top, from the left to the right, and from the right to the left.

Characteristics of the lower layer echo detection processing accompanied by propagation will be described.

Strictly speaking, an ultrasonic wave propagation speed varies depending on a material of a structure in an electronic component through which the transmitted wave passes. Even if the common lower layer interface is parallel to the XY plane, the reception time of the common lower layer interface echo is slightly misaligned. Such misalignment can be absorbed by the propagation.

As described above, the example in which the local peaks between the reflected waves are associated by the propagation of the lower layer wave has been described, but the reflected waves may be collectively associated with each other by elastic matching based on dynamic programming. As described above, there are a plurality of types of association methods, but by associating local peaks between all reflected waves, it is possible to detect an echo from the common lower layer interface even in a case where a reflected signal from the surface cannot be obtained, that is, in a case where a trigger point cannot be obtained.

The description returns to FIG. 1.

(S107) After the lower layer echo is detected for each reflected ultrasonic wave, a reception time of each reflected ultrasonic wave is adjusted based on the reception time of the local peak selected in the second reference wave. More specifically, a reception time of each reflected ultrasonic wave is adjusted so that lower layer echoes (or local peaks included therein) selected in each reflected ultrasonic wave have the same reception time. In other words, it can be said that a reception time of each reflected ultrasonic wave is adjusted so that lower layer echoes (or local peaks included therein) derived from the common lower layer interface have the same reception time. Note that, in the following description, this processing may be referred to as a "time adjustment". Hereinafter, a case where a reception time is adjusted with a local peak will be described as an example.

<Time Adjustment of Reflected Ultrasonic Wave>

Figure 9:
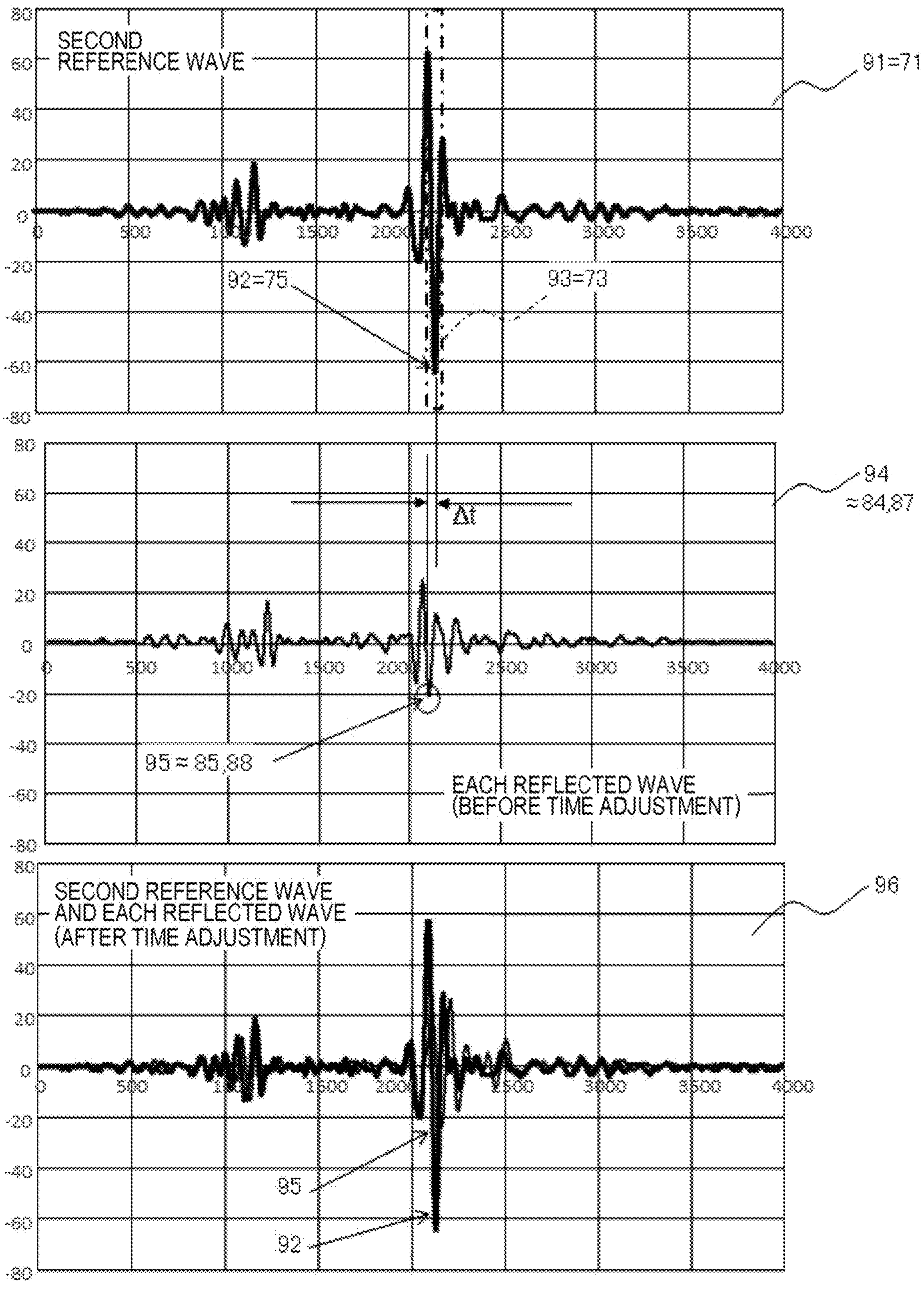
FIG. 9 is an example of time adjustment processing on a reflected ultrasonic wave.

FIG. 9 illustrates an example in which time adjustment is performed on a reflected ultrasonic wave (reflected wave). Reference sign 91 denotes a second reference wave, and reference sign 92 denotes a selected local peak. Reference sign 93 (a time range indicated by an alternate long and short dash line) denotes a lower layer echo with the local peak 92 being as a time center. Reference signs 91, 92, and 93 correspond to reference signs 71, 75, and 73 in FIG. 7, respectively. Reference sign 94 denotes a reflected ultrasonic wave (each reflected wave before time adjustment) obtained from another measurement point, and corresponds to reference signs 84 and 87 in FIG. 8. A local peak 95 (surrounded by a circle for easy understanding) of the reflected ultrasonic wave 94 is a local peak selected in S106, which corresponds to the local peak 92 (corresponding to reference signs 85 and 88 in FIG. 8) of the second reference wave 91 selected in S105. A reception time of the local peak 95 is earlier than that of the local peak 92 by Δt. In this case, the reflected ultrasonic wave 94 is shifted backward by Δt on the time axis so that Δt becomes 0. That is, time adjustment is performed on the reflected ultrasonic wave 94 based on the local peak 92. Reference sign 96 denotes a reflected ultrasonic wave 94 (each reflected wave) superimposed on 91 after the time adjustment.

The description returns to FIG. 1.

(S108) Next, a largest reflection intensity or a smallest reflection intensity in a second gate is acquired for the reflected ultrasonic wave on which the above-described time adjustment has been performed. This processing is performed for each of the plurality of second gates. Note that "the acquisition of the largest reflection intensity or the smallest reflection intensity" for the reflected wave can also be said to "acquire a largest absolute value". Note that the second gate is not time-adjusted (that is, shifted). If the reception time of the second gate in FIG. 9 is defined around 2000, a local peak having a small absolute value is detected as a target in the reflected wave 94 (before time adjustment). On the other hand, in the reflected wave after the time adjustment, since a suitable local peak is close to the time 2000 as in 96, the suitable local peak is included in the second gate around the time 2000.

(S109) The above-described steps S106 to S108 are performed on the all reflected wave in the measurement region of the sample.

(S110) The reflection intensity detected in S108 is converted into a gray value. As a result, a second cross-sectional image 1-3 that is a cross-sectional image for defect inspection is generated, and the second cross-sectional image 1-3 is output. The number of second cross-sectional images 1-3 to be output is plural, and is determined according to the number of cross-sectional images received in the condition 1-1. For example, in a case where six second gates are defined as the second gates 63 to 68 as illustrated in FIG. 6, six second cross-sectional images 1-3 are output. The method of converting the reflection intensity into the gray value may be the same as that in the F-Gate.

Figure 10:
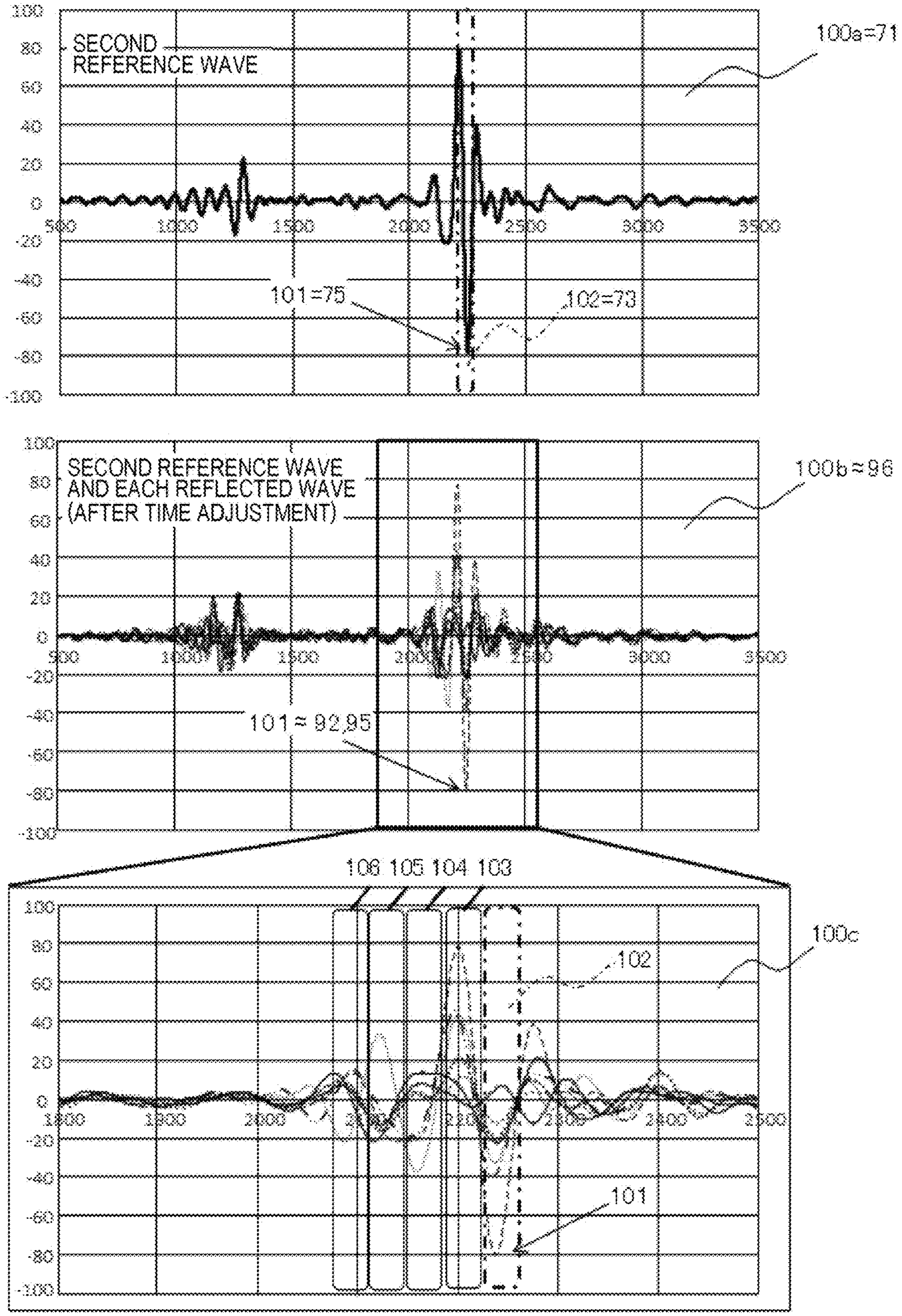
FIG. 10 is a diagram illustrating a relationship between a reflected ultrasonic wave after time adjustment and a second gate.

FIG. 10 illustrates an example of a relationship between the reflected wave after the time adjustment and the plurality of second gates.

In FIG. 10, reference sign 100*a* denotes an example of a second reference wave, reference sign 101 denotes a local peak detected in the second reference wave 100*a*, and reference sign 102 denotes a lower layer echo with the local peak 101 being as a time center. The second reference wave 100*a* corresponds to the second reference wave 71 in FIG. 7, the lower layer echo 102 corresponds to the lower layer echo 73 in FIG. 7, and the local peak 101 corresponds to the local peak 75 in FIG. 7. Reference sign 100*b* denotes reflected wave after time has been adjusted a plurality of reflected ultrasonic waves (including the second reference wave) obtained from a plurality of measurement points. Some of the reflected waves of 100*b* correspond to 96 in FIGS. 9, and 101 corresponds to the local peaks 92 and 95 in FIG. 8.

Reference sign 100*c* denotes an enlarged portion of the reflected waves of 100*b*. In the drawing, it is illustrated that four gates 103 to 106 indicated by solid lines before the lower layer echo 102 indicated by an alternate long and short dash line on the time axis are defined as second gates. Then, a second cross-sectional image 1-3 (see FIG. 1) is generated according to the largest reflection intensity and the smallest reflection intensity in each gate.

As a result, it is possible to generate images of a plurality of bonding interfaces located in a layer spaced apart by a certain distance from and above the common lower layer interface.

The description returns to FIG. 1.

(S111) Furthermore, in the present embodiment, in addition to the generation of the images of the bonding interfaces in the sample, a defect is detected from the generated images of the bonding interfaces, and a detection result 1-4 is output.

<Example of Defect Detection>

Figure 11:
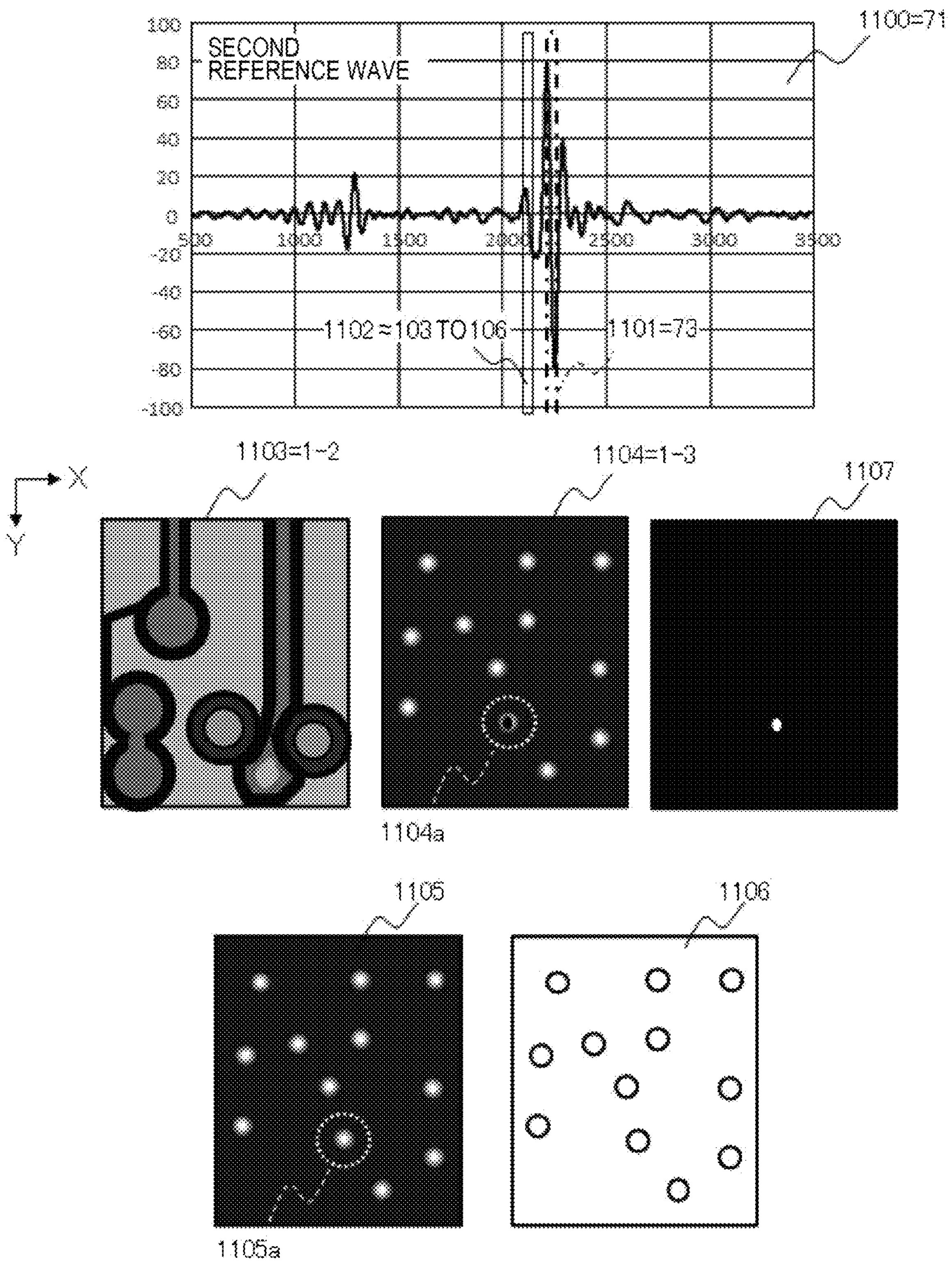
FIG. 11 is an example of processing of automatically detecting a defect.

FIG. 11 illustrates an example of the defect detection processing S111. Reference sign 1100 denotes an example of a second reference wave, reference sign 1101 denotes a lower layer echo, and reference sign 1102 denotes a second gate. Note that the second reference wave 1100 corresponds to the second reference wave 71 in FIG. 7, and the lower layer echo 1101 corresponds to the lower layer echo 73 in FIG. 7. The second gate 1102 corresponds to any one of the second gates 103 to 106 in FIG. 10.

In addition, reference sign 1103 denotes a first cross-sectional image generated based on the first gate (corresponding to 1-2 in FIG. 1). The first gate has a wide time range including a lower layer echo. Therefore, in the present example, since the lower layer echo has a stronger reflection intensity than an echo from another interface, the first cross-sectional image 1103 includes many wiring patterns of the common lower layer interface (here, the bottom surface). Since the first gate 62 is defined as having a wide time width as illustrated in FIG. 6, if there is a structure having a higher reflection intensity on the top surface than the common lower layer interface, the first cross-sectional image may include such a structure.

On the other hand, reference sign 1104 denotes a second cross-sectional image generated based on the reflection intensity in the second gate 1102 (corresponding to 1-3 in FIG. 1). By setting the width of the second gate 1102 to a narrow time range, the second cross-sectional image 1104 apparently shows bumps on a layer higher than the bottom surface while eliminating the influence of the wiring patterns on the bottom surface. That is, since the second gate 1102 is defined as having a narrow time width, only a structure in a specific depth region is observed in the second cross-sectional image 1104. Note that the user may change the time range of each second gate on the basis of the second cross-sectional image 1104 so that the structure and the defect become more apparent.

When inspecting a bump bonding layer, it is necessary to detect a bonding defect such as a crack of a bump. Here, an image of a bump 1104*a* surrounded by a broken line in the second cross-sectional image 1104 has a dark central portion, which indicates a defect, as compared with the other bumps, and the user can detect the defect by visually confirming the second cross-sectional image 1104.

Furthermore, in the present embodiment, it is also possible to automatically detect a defect.

As an example of such a detection method, a non-defective product image is generated and stored in advance, and a product image is compared with the non-defective product image. Reference sign 1105 denotes an example of an image of a non-defective product. The non-defective product image 1105 needs to be known to include no defect. An image of a sample of the same type which is visually determined not to include a defect may be adopted as the non-defective product image 1105. Alternatively, the non-defective product image 1105 may be generated by acquiring images of a plurality of samples of the same type, and calculating an average value or a median value of gray values of the images, and converting the calculated value to an image.

Then, a pixel of the second cross-sectional image 1104 having a difference in gray value larger than a predefined threshold (which may be a fixed value or a value received from a user) with respect to a corresponding pixel of the non-defective product image 1105 may be detected as a defect. In the non-defective product image 1105, a central portion of a bump 1104*a* located at the same position as the bump 1105*a* is bright, which is regarded as a non-defective product, and therefore, it is determined that 1104*a* is defective.

As another example of the detection method, design data regarding a vertical structure and a horizontal structure of an inspection object (sample), that is, bump layout information, may be used. Reference sign 1106 denotes an example of design data, and shows information on how the bumps are arranged in the measurement region using circular lines. The ultrasonic inspection device 100 according to the present embodiment receives information on the layout of wiring patterns or the like of each layer for the sample 5 (see FIG. 2) to be inspected as design information (1-5 in FIG. 1), and the layout information can be used for defect detection. Based on a bump region (the inside of each circle) of the design data 1106, a gray value feature (e.g., an average gray value or a standard deviation) of each bump in the second cross-sectional image 1104 is calculated, and a bump of which the feature deviates from the deviation range of the non-defective product is detected as a defect.

1104*a*, which has a lower average gray value and a larger standard deviation than the other bumps in the second cross-sectional image 1104, can be detected as a defect.

In this manner, the defect detection unit 7-2 extracts the image of the defect. Reference sign 1107 in FIG. 11 denotes an example of a defect detection result (1-4 in FIG. 1).

In addition to the first cross-sectional image 1-2, the second cross-sectional image 1-3, and the defect detection result 1-4 described above, reflected ultrasonic waves such as a first reference wave and a second reference wave, processing results, and the like are appropriately displayed on the user interface unit 17 by the data output unit 7-3.

The design information for each layer is received through the design data for use in defect detection as described above, but the design information in the depth direction can also be received and used as the design information 1-5. An example of the design information in the depth direction is a thickness (information about a vertical or horizontal direction) or a material of each layer. From these pieces of information, a reception time of a reflected wave from a desired bonding interface may be calculated, and the second gate 1102 may be defined in the reflected wave 1100 in FIG. 11. Note that the user may be able to finely adjust the defined second gate in a time-axis direction while checking the generated image.

Figure 12:
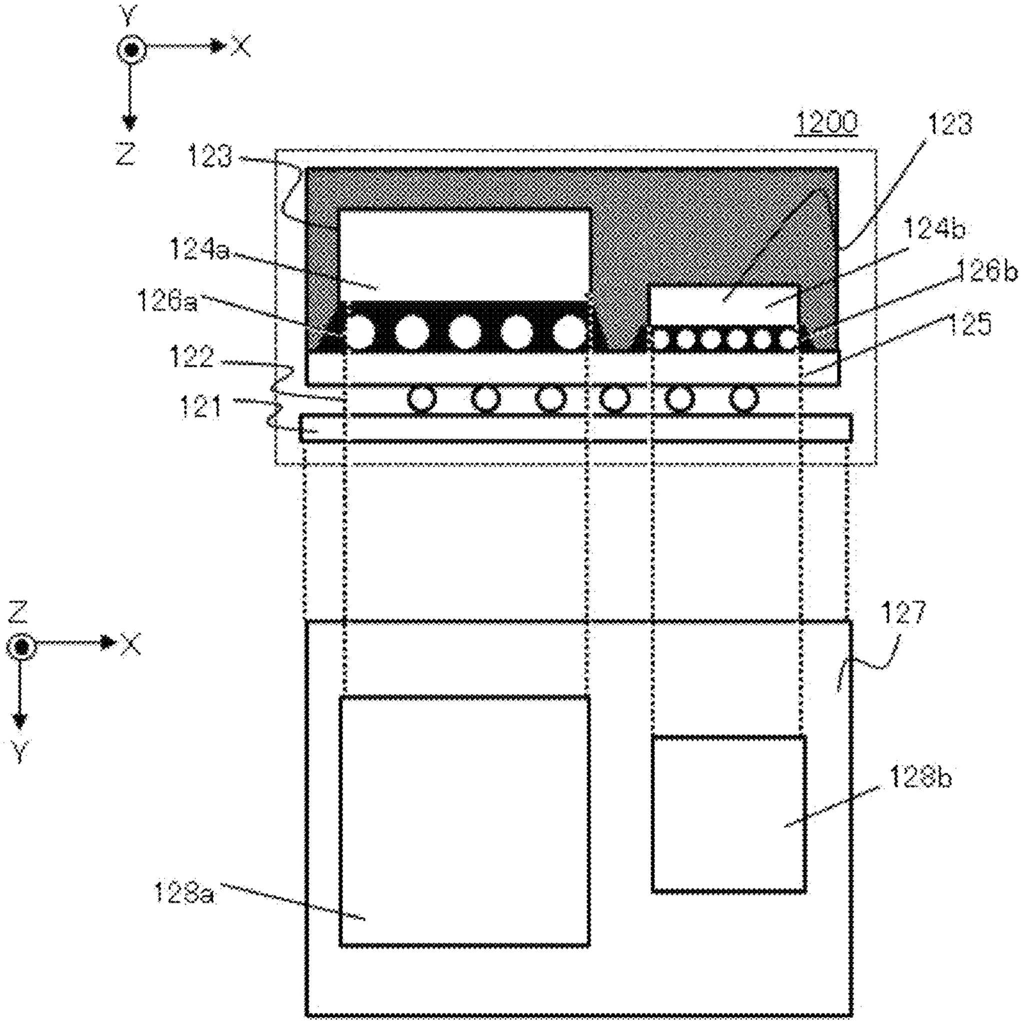
FIG. 12 is a diagram illustrating an example of an inspection object having a plurality of chips.

According to the embodiment described above, it is possible to detect a defect even for a sample having different vertical structures within a measurement region surface. FIG. 12 illustrates an example of such processing.

Reference sign 1200 denotes an example schematically illustrating an internal structure of an electronic component (an inspection object) having different vertical structures within a measurement region surface. The inspection object 1200 is obtained by bonding semiconductor devices 123 onto a printed wiring board 121, which is a lowermost layer, via solder balls 122. Different types of chips (here, two types of chips 124*a* and 124*b*) are mounted on the semiconductor devices 123, and the semiconductor devices are connected to an interposer board 125 via bump layers 126*a* and 126*b*, respectively.

Mold underfilling for sealing the periphery of each of the bump layers 126*a* and 126*b* with a liquid sealing material (an underfill material, a black portion in the drawing) is performed. In addition, over-molding for entirely sealing the semiconductor devices with a resin (a shaded portion in the drawing) is performed, and the semiconductor devices are protected from the outside. Since the vertical structure of the inspection object 1200 varies depending on the position on the XY plane, there is a difference between times at which reflected waves of ultrasonic waves incident from the surface side (the upper side in the drawing) of the inspection object 1200 are received from bump layers 126*a* and 126*b*, respectively. This is because the resin used for sealing may be different, in a speed at which an ultrasonic wave moves therethrough, from other materials used for electronic components. In such an inspection object 1200, inspection may be performed by the processing described above separately for each chip. For example, based on the layout information on the XY plane and the vertical structure information, that is, the Z-direction structure information, an echo (that is, a lower layer echo) from a front surface or a back surface (both correspond to the above-described common lower layer interface) of the interposer board 125, which is a common board, is detected from each reflected wave in each of the two-divided measurement regions. Then, for each of the divided measurement regions, second gates may be defined in different time ranges for the respective regions after the time adjustment of the reflected waves.

Reference sign 127 in FIG. 12 denotes a measurement region when the inspection object 1200 is viewed from the top surface, and shows that two different regions 128*a* and 128*b* have different vertical structures. Based on the reflected wave obtained in the region 128*a* and the reflected wave obtained in the region 128*b*, different lower layer echoes can be recognized, and second gates can be defined in different time ranges to generate cross-sectional images of two types of bump layers.

<Hardware Configuration>

Figure 13:
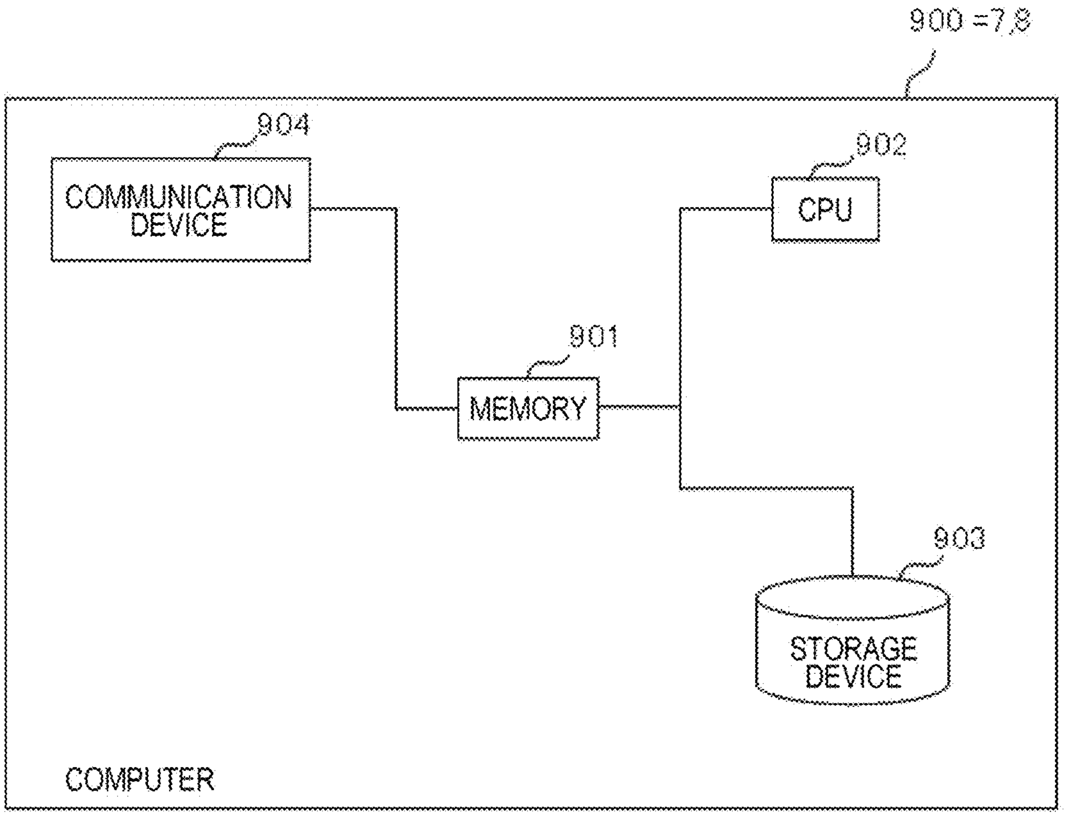
FIG. 13 is a diagram illustrating a hardware configuration of a computer.

FIG. 13 is a diagram illustrating a hardware configuration of a computer 900.

The computer 900 is one of forms in which the signal processing unit 7 and the overall control unit 8 illustrated in FIG. 3 are implemented. Each unit may be implemented by a plurality of computers 900. For example, parallel calculation may be performed by the plurality of computers 900. Alternatively, a tablet computer including the user interface unit 17 may be included.

The computer 900 includes a memory 901, a central processing unit (CPU) 902, a storage device 903 such as a hard disk (HD), and a communication device 904 such as a network interface card (NIC).

Then, programs stored in the storage device 903 is loaded onto the memory 901, and the loaded programs are executed by the CPU 902. As a result, the functions of the image generation unit 7-1, the defect detection unit 7-2, the data output unit 7-3, the parameter setting unit 7-4, and the overall control unit 8 illustrated in FIG. 3 are embodied. The storage device 903 can correspond to the database 18 or the storage device 19 in FIG. 3. Although not illustrated, the computer 900 may include a display, a touch panel, a mouse, or a keyboard which is an example of the user interface unit 17.

In the present embodiment, the signal processing unit 7 and the overall control unit 8 are configured by different computers 900, but the present invention is not limited thereto. The integration of the signal processing unit 7 and the overall control unit 8 as described above may be realized by the common computer 900. Furthermore, a distribution server (not illustrated) that distributes programs for embodying the functions of the image generation unit 7-1, the defect detection unit 7-2, the data output unit 7-3, the parameter setting unit 7-4, and the overall control unit 8 to the signal processing unit 7 and the overall control unit 8 may be provided. In addition, such programs may be distributed in a state of being stored in a non-volatile storage medium such as a USB memory. Such a medium is used for setting up the ultrasonic inspection device 100 and updating the functions of the ultrasonic inspection device 100.

In the example illustrated in FIG. 13, the CPU 902 is described as an example of a processor that executes the programs. However, the present invention is not limited thereto, and a graphics processing unit (GPU) or the like may be used as a processor, or another semiconductor device may be used as a processor as long as it is a subject that executes predetermined processing. In addition, the computer 900 may include other components.

Furthermore, the configuration of the computer 900 may be adopted as one of forms in which the mechanical controller 16 is implemented. In this case, the computer 900 may include an element or a circuit that drives the scanner 13 (see FIG. 3). Examples thereof include a driver IC for a stepping motor or a driver circuit for a DC motor that supply a voltage or a current to a motor included in the scanner 13.

<Variations>

The present embodiment has been described above. The following matters may be considered as variations.

In the present embodiment, the reflected wave acquired in S102 and stored in the database 18 (see FIG. 3) is used as a reflected wave used in S106. However, the present invention is not limited thereto, and a sample (inspection object) may be newly irradiated with an ultrasonic wave in S106.

When the condition 1-1 in FIG. 1 is determined in advance, S101 may be skipped. Alternatively, in S101, an ultrasonic wave may be emitted and acquired so as to scan an inspection place of the sample, and the acquired reflected wave may be stored in the database 18. In this case, as the first reference wave, the reflected wave, and the second reference wave in FIG. 1, (data on) the reflected waves stored in the database 18 may be used.

Furthermore, in the present embodiment, the time range width of the lower layer echo is matched with the time width of the second gate, but it is not necessary to match the time range width of the lower layer echo with the time width of the second gate.

Furthermore, in the present embodiment, the processing of S106 to S109 is performed for each of the reflected waves, but all of the reflected waves may be acquired at a time, and time adjustment (S107) may be performed on all of the reflected waves at a time.

In addition, in the present embodiment, a first cross-sectional image is generated, and a place for acquiring a second reference wave is selected based on the first cross-sectional image. However, for example, the user may select a place for acquiring a second reference wave based on the design information. By doing so, the generation of the first cross-sectional image can be omitted, thereby reducing the processing procedure.

It should be noted that another method may be used as long as the number of interfaces in the Z-axis direction is smaller, that is, a position from which the common lower layer interface is directly reached can be selected, except for the surface, as a place where a second reference wave is to be obtained.

The liquid that mediates ultrasonic waves may be other than water.

In the above-described example, as illustrated in FIG. 1, a method has been described in which all reflected waves in the measurement region are acquired and stored in S102, and the stored reflected waves is reused in the subsequent processing. As a result, when second cross-sectional images 1-3 are generated, the ultrasonic probe 2 does not need to perform scanning to re-acquire all reflected waves, but it takes time to store all the reflected waves once. However, in order to pursue real-time performance, the processing of the image generation unit 7-1 may be performed in real time in parallel with the scanning of the ultrasonic probe 2, without storing all the reflected waves, whenever images are generated.

The position U may be determined by the user's designation while the user is checking the first cross-sectional image 1-2 displayed on the screen. Furthermore, the user's selection may be supported by displaying the position U determined by the signal processing unit 7 on the first cross-sectional image 1-2 as a recommended point (or a recommended region).

The lower layer echo does not need to be defined with the local peak being the center thereof. For example, when a local peak of a transmitted wave or a reflected wave is misaligned with the center of the ½ waveform by a predetermined rate, the misalignment rate may be taken into consideration.

The width of the lower layer echo does not need to be the same as the width of the second gate. For example, the width of the lower layer echo may be a time width corresponding to the ½ wavelength of the transmitted or reflected wave.

It has been described that the time adjustment of the reflected wave 94 is performed with respect to the local peak based on the second reference wave 91. However, the time adjustment may be performed based on any reflected wave other than the second reference wave, or may be performed to a time other than the local peak.

The reflected waves other than the second reference wave after the time adjustment may be output to the user interface unit 17. When the reflected waves other than the second reference wave are output, a text, a symbol, or an emphasis color indicating that the time adjustment has been performed may be output together.

Although it has been described above that one pixel of a cross-sectional image corresponds to one measurement point, but it is not necessary to do so.

Concerning the propagation of the lower layer echo described with reference to FIG. 8, a measurement point of a propagation source and a measurement point of a propagation destination do not necessarily need to be adjacent to each other in corresponding pixels, and the lower layer echo may be propagated in a case where the pixels or the measurement points are located within a predetermined range (equal to or larger than a distance between the measurement regions corresponding to the adjacent pixels). In a case where the reception time of the lower layer echo is not greatly misaligned, even if the predetermined range is set to be large, it is possible to suitably detect a lower layer echo or select a local peak. In terms of pixels, propagation may be performed on pixels spaced apart from each other by two or three pixels.

In addition, the propagation unit is not necessarily one pixel or one measurement point as described above, but the propagation may be performed collectively by a plurality of pixels or a plurality of measurement points.

The ultrasonic inspection device that performs the processing of FIG. 1 may switch the cross-sectional image generation processing mode according to an instruction received from the user. In this case, in a first mode, an image may be generated by the processing described so far with reference to FIG. 1, and in a second mode, a cross-sectional image may be generated using an S-Gate and an F-Gate.

In the above description, it has been described that the first gate is an entity that allows the user to designate a time range in which a second gate is defined and a time range in which a lower layer echo or a local peak considered to be reflected from the common lower layer interface is detected. However, in setting the first gate, other meanings may be added to the above-described meanings by the user, or only some of the above-described meanings may be adopted by the user.

In addition, some or all of the above-described configurations, functions, units 7-1 to 7-4 and 8, database 18, storage device 19, and the like may be realized by hardware, for example, by designing them with an integrated circuit. In addition, as illustrated in FIG. 13, the above-described configurations, functions, and the like may be realized by software by a processor such as the CPU 902 interpreting and executing programs for realizing the functions. Information such as programs, tables, and files for realizing the functions can be stored not only in a hard disk (HD) but also in a recording device such as the memory 901 or a solid state drive (SSD) or in a recording medium such as an integrated circuit (IC) card, a secure digital (SD) card, or a digital versatile disc (DVD).

In addition, in each aspect of the embodiments, control lines and information lines considered to be necessary for description are illustrated, and all control lines and information lines in the product are not necessarily illustrated. In practice, it may be considered that almost all the components are connected to each other.

SUMMARY

What has been described above in the present specification is summarized as follows.

<<Viewpoint 1>>

An ultrasonic inspection device including:

an ultrasonic probe configured to generate an ultrasonic wave, transmit the ultrasonic wave to an inspection object, and receive a reflected wave from the inspection object; and a controller, in which the controller is configured to:

(A) define a first gate indicating a time range in which a part of the reflected wave is extracted based on a predetermined condition received from a user;

(B) define one or more second gates each indicating a time width smaller than that of the first gate before an end time of the first gate;

(C) for each of a plurality of measurement points of the inspection object, (C1) detect a lower layer echo or a local peak reflected from an interface of a lower layer than a top surface of the inspection object from the reflected wave corresponding to the measurement point, and (C2) adjust a reception time of the reflected wave based on the lower layer echo or the local peak; and (D) generate a cross-sectional image of the inspection object based on a reflected wave after time adjustment and the second gate.

<<Viewpoint 2>>

The controller may be further configured to:

(E) acquire a first reference wave that is a reflected wave from a first reference measurement point of the inspection object; and (F) display the first reference wave on a user interface before the predetermined condition is received from a user.

<<Viewpoint 3>>

The controller may further be configured to:

(G) acquire a second reference wave that is a reflected wave from a second reference measurement point of the inspection object; and (H) detect a reference lower layer echo or a reference local peak reflected from an interface of the lower layer from the second reference wave, and in (C2), a reception time is adjusted based on the reference lower layer echo or the reference local peak.

<<Viewpoint 4>>

The controller may be further configured to:

(I) generate a cross-sectional image of the inspection object based on a reflected wave before time adjustment and the first gate; and (J) with respect to pixels constituting a cross-sectional image generated in (I), evaluate each of the pixels based on a gray value of the pixel and a change in gray value between the pixel and peripheral pixels, and determine a measurement point corresponding to a predetermined pixel as the second reference measurement point.

<<Viewpoint 5>>

As (C1), to detect a lower layer echo or a local peak from a predetermined first reflected wave corresponding to a predetermined first measurement point, the controller may be configured to:

(C1A) select a predetermined second measurement point located within a predetermined range from the predetermined first measurement point; and (C1B) acquire a time range of a lower layer echo detected from a predetermined second reflected wave corresponding to the predetermined second measurement point;

(C1C) select a local peak from the predetermined first reflected wave within the time range acquired in (C1B); and (C1D) detect a lower layer peak from the predetermined first reflected wave based on the local peak selected in (C1C).

<<Viewpoint 6>>

The time width of the second gate may be equal to or shorter than one wavelength of an ultrasonic wave transmitted to the inspection object.

<<Viewpoint 7>>

In (B), a second gate may be defined based on the number of cross-sectional images received from a user.

<<Viewpoint 8>>

The interface of the lower layer than the top surface may be an interface of a lower layer commonly existing over a wide range or an entirety of a measurement region of the inspection object.

<<Viewpoint 9>>

The interface of the lower layer than the top surface may be a bottom surface of a printed wiring board or an interposer board included in the inspection object.

<<Viewpoint 10>>

In (B), a second gate may be defined based on a vertical structure and a horizontal structure in design data of the inspection object received from a user.

<<Viewpoint 11>>

The inspection object may include a first chip and a second chip having a different structure from the first chip, the processing from (A) to (D) may be performed for each chip, and a time range of a second gate or the number of second gates related to the first chip may be defined to be different from a time range of a second gate or the number of second gates related to the second chip.

<<Viewpoint 12>>

The first gate may be an entity that allows a user to designate a range in which the second gate is defined and a time range in which the lower layer echo or the local peak reflected from the interface of the lower layer than the top surface is detected.

<<Viewpoint 13>>

The controller may switch between a first mode in which a cross-sectional image is generated by performing the processing from (A) to (D) and a second mode in which a cross-sectional image is generated using an S-Gate and an F-Gate according to an instruction received from a user.

REFERENCE SIGNS LIST

1-1 condition (predetermined condition, including number of cross-sectional images)
1-2, 1103 first cross-sectional image (cross-sectional image based on first gate)
1-3, 1104 second cross-sectional image (cross-sectional image based on second gate)
1-4 detection result
1-5 design information
2 ultrasonic probe
4, 50, 55, 84, 87 reflected wave
5 sample (inspection object)
7 signal processing unit (controller)
7-1 image generation unit (controller)
7-2 defect detection unit (controller)
17 user interface unit (user interface)
121 printed wiring board (including interface of lower layer)
46, 125 interposer board (including interface of lower layer)
51, 56 S-Gate
52, 57 F-Gate
60 first reference wave
62, 72 first gate
63 to 68, 103 to 106, 1102 second gate
71, 74, 91, 100*a*, 1100 second reference wave
73, 83, 86, 89, 93, 102, 1101 lower layer echo (reference lower layer echo)
82, 85, 88, 92, 95, 101 local peak (reference lower layer peak)
81 second reference wave (second reflected wave)
84, 87 reflected ultrasonic wave (first reflected wave)
94 reflected ultrasonic wave (reflected wave)
400, 1200 inspection object
100 ultrasonic inspection device
100*b*, 100*c* reflected wave after time has been adjusted (reflected wave after time adjustment)
124*a* chip (first chip)
124*b* chip (second chip)
128*a*, 128*b* region
1106 design data
U position (second reference measurement point, second measurement point)
M position (second reference measurement point, first measurement point)

The invention claimed is:

1. An ultrasonic inspection device comprising:

an ultrasonic probe configured to generate an ultrasonic wave, transmit the ultrasonic wave to an inspection object, and receive a reflected wave from the inspection object; and a controller, wherein the controller is configured to:

(A) define a first gate indicating a time range in which a part of the reflected wave is extracted based on a predetermined condition received from a user;

(B) define one or more second gates each indicating a time width smaller than that of the first gate before an end time of the first gate;

(C) for each of a plurality of measurement points of the inspection object, (C1) detect a lower layer echo or a local peak reflected from an interface of a layer lower than a top surface of the inspection object from the reflected wave corresponding to the measurement point, and (C2) adjust a reception time of the reflected wave based on the lower layer echo or the local peak; and (D) generate a cross-sectional image of the inspection object based on a reflected wave after time adjustment and the second gate.

2. The ultrasonic inspection device according to claim 1, wherein the controller is further configured to:

(E) acquire a first reference wave that is a reflected wave from a first reference measurement point of the inspection object; and (F) display the first reference wave on a user interface before the predetermined condition is received from the user.

3. The ultrasonic inspection device according to claim 1, wherein the controller is further configured to:

(G) acquire a second reference wave that is a reflected wave from a second reference measurement point of the inspection object; and (H) detect a reference lower layer echo or a reference local peak reflected from an interface of the lower layer from the second reference wave, and in (C2), the reception time is adjusted based on the reference lower layer echo or the reference local peak.

4. The ultrasonic inspection device according to claim 3, wherein the controller is further configured to:

(I) generate a cross-sectional image of the inspection object based on a reflected wave before time adjustment and the first gate; and (J) with respect to pixels constituting the cross-sectional image generated in (I), evaluate each of the pixels based on a gray value of the pixel and a change in gray value between the pixel and peripheral pixels, and determine a measurement point corresponding to a predetermined pixel as the second reference measurement point.

5. The ultrasonic inspection device according to claim 4, wherein, as (C1), to detect a lower layer echo or a local peak from a predetermined first reflected wave corresponding to a predetermined first measurement point, the controller is configured to:

(C1A) select a predetermined second measurement point located within a predetermined range from the predetermined first measurement point; and (C1B) acquire a time range of a lower layer echo detected from a predetermined second reflected wave corresponding to the predetermined second measurement point;

(C1C) select a local peak from the predetermined first reflected wave within the time range acquired in (C1B); and (C1D) detect a lower layer peak from the predetermined first reflected wave based on the local peak selected in (C1C).

6. The ultrasonic inspection device according to claim 1, wherein a time width of the second gate is equal to or shorter than one wavelength of an ultrasonic wave transmitted to the inspection object.

7. The ultrasonic inspection device according to claim 1, wherein, in (B), the second gate is defined based on the number of cross-sectional images received from the user.

8. The ultrasonic inspection device according to claim 1, wherein the interface of the layer lower than the top surface is an interface of a lower layer commonly existing over a wide range or an entirety of a measurement region of the inspection object.

9. The ultrasonic inspection device according to claim 1, wherein the interface of the layer lower than the top surface is a bottom surface of a printed wiring board or an interposer board included in the inspection object.

10. The ultrasonic inspection device according to claim 1, wherein, in (B), the second gate is defined based on a vertical structure and a horizontal structure in design data of the inspection object received from the user.

11. The ultrasonic inspection device according to claim 1,
- wherein the inspection object includes a first chip and a second chip having a different structure from the first chip,
- the processing from (A) to (D) is performed for each chip, and
- a time range of a second gate or the number of second gates related to the first chip is defined to be different from a time range of a second gate or the number of second gates related to the second chip.

12. The ultrasonic inspection device according to claim 2, wherein the first gate is an entity that allows the user to designate a range in which the second gate is defined and a time range in which the lower layer echo or the local peak reflected from the interface of the layer lower than the top surface is detected.

13. The ultrasonic inspection device according to claim 1, wherein the controller switches between a first mode in which a cross-sectional image is generated by performing the processing from (A) to (D) and a second mode in which a cross-sectional image is generated using an S-Gate and an F-Gate according to an instruction received from the user.

14. An ultrasonic inspection method performed by an ultrasonic inspection device including:
- an ultrasonic probe configured to generate an ultrasonic wave, transmit the ultrasonic wave to an inspection object, and receive a reflected wave from the inspection object; and
- a controller, the ultrasonic inspection method comprising:
- (A) defining a first gate indicating a time range in which a part of the reflected wave is extracted based on a predetermined condition received from a user;
- (B) defining one or more second gates each indicating a time width smaller than that of the first gate before an end time of the first gate;
- (C) for each of a plurality of measurement points of the inspection object,
- (C1) detecting a lower layer echo or a local peak considered as reflected from an interface of a layer lower than a top surface of the inspection object from the reflected wave corresponding to the measurement point, and
- (C2) adjusting a reception time of the reflected wave based on the lower layer echo or the local peak; and
- (D) generating a cross-sectional image of the inspection object based on a reflected wave after time adjustment and the second gate.

15. One or more non-transitory computer readable storage media storing one or more sequences of instructions which, when executed using one or more processors of an ultrasonic inspection system, cause the one or more processors to execute:
- (A) defining a first gate indicating a time range in which a part of a reflected wave is extracted based on a predetermined condition received from a user;
- (B) defining one or more second gates each indicating a time width smaller than that of the first gate before an end time of the first gate;
- (C) for each of a plurality of measurement points of the inspection object,
- (C1) detecting a lower layer echo or a local peak considered as reflected from an interface of a layer lower than a top surface of the inspection object from the reflected wave corresponding to the measurement point, and
- (C2) adjusting a reception time of the reflected wave based on the lower layer echo or the local peak; and
- (D) generating a cross-sectional image of the inspection object based on a reflected wave after time adjustment and the second gate.

* * * * *